(12) United States Patent
Sunaga et al.

(10) Patent No.: US 6,991,338 B2
(45) Date of Patent: Jan. 31, 2006

(54) PROJECTION OPTICAL SYSTEM, PROJECTION TYPE IMAGE DISPLAY APPARATUS, AND IMAGE DISPLAY SYSTEM

(75) Inventors: Toshihiro Sunaga, Tokyo (JP); Katsumi Kurematsu, Tokyo (JP); Takayuki Ishii, Tokyo (JP); Yoshiaki Kurioka, Tokyo (JP); Sawako Chatani, Port Washington, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 10/630,407

(22) Filed: Jul. 30, 2003

(65) Prior Publication Data
US 2004/0032571 A1 Feb. 19, 2004

(30) Foreign Application Priority Data
Jul. 30, 2002 (JP) .............................. 2002-221772

(51) Int. Cl.
G03B 21/22 (2006.01)
G03B 21/26 (2006.01)
G03B 21/28 (2006.01)
G02B 27/14 (2006.01)
G02B 5/10 (2006.01)

(52) U.S. Cl. ........................... 353/99; 353/37; 353/78; 359/631; 359/633; 359/858; 359/859

(58) Field of Classification Search ................ 359/859, 359/633, 731, 858, 729, 730, 727, 637, 631, 359/630; 353/37, 78, 99
See application file for complete search history.

(56) References Cited
U.S. PATENT DOCUMENTS

| | | | |
|---|---|---|---|
| 5,309,276 A * | 5/1994 | Rodgers ..................... 359/366 |
| 5,825,560 A | 10/1998 | Ogura et al. ................ 359/822 |
| 5,847,887 A | 12/1998 | Ogura et al. ................ 359/822 |
| 5,999,311 A | 12/1999 | Nanba et al. ............... 359/365 |
| 6,021,004 A | 2/2000 | Sekita et al. ................ 359/676 |
| 6,120,156 A | 9/2000 | Akiyama .................... 359/857 |
| 6,166,859 A | 12/2000 | Inuzuka et al. ............. 359/633 |
| 6,166,866 A | 12/2000 | Kimura et al. ............. 359/729 |
| 6,268,963 B1 * | 7/2001 | Akiyama .................... 359/631 |
| 6,278,553 B1 | 8/2001 | Akiyama .................... 359/627 |
| 6,292,309 B1 | 9/2001 | Sekita et al. ................ 359/729 |
| 6,301,064 B1 | 10/2001 | Araki et al. ................ 359/834 |
| 6,313,942 B1 | 11/2001 | Nanba et al. ............... 359/129 |

(Continued)

FOREIGN PATENT DOCUMENTS
EP 1 139 145 A2 10/2001

(Continued)

OTHER PUBLICATIONS
European Search Report, Dated Nov. 26, 2003.

*Primary Examiner*—Melissa Jan Koval
(74) *Attorney, Agent, or Firm*—Morgan & Finnegan, LLP

(57) ABSTRACT

A projection optical system having a plurality of reflecting surfaces is disclosed in which a sufficiently large angle is provided between an incident side reference axis and an emerging side reference axis while tilt angles of the respective reflecting surfaces can remain small. The projection optical system projects luminous flux from an image forming element which forms an original image onto a projection surface. The incident side reference axis and the emerging side reference axis of the projection optical system are oblique to each other. The projection optical system has a plurality of reflecting surfaces each having a curvature. The reflecting surfaces are arranged such that the reference axis has at least one intersection in the projection optical system.

10 Claims, 19 Drawing Sheets

U.S. PATENT DOCUMENTS

| | | | |
|---|---|---|---|
| 6,366,411 B1 | 4/2002 | Kimura et al. | 359/729 |
| 6,426,841 B1 | 7/2002 | Araki et al. | 359/834 |
| 6,459,530 B2 | 10/2002 | Nanba et al. | 359/365 |
| 6,510,006 B1 | 1/2003 | Togino | 359/631 |
| 6,522,475 B2 | 2/2003 | Akiyama et al. | 359/676 |
| 6,529,330 B1 | 3/2003 | Sekita et al. | 708/552 |
| 2002/0008853 A1 | 1/2002 | Sunaga | 353/69 |
| 2002/0105734 A1 | 8/2002 | Kimura et al. | 359/729 |
| 2002/0149854 A1 | 10/2002 | Tanaka et al. | 359/627 |
| 2003/0137742 A1 | 7/2003 | Akiyama et al. | 359/627 |
| 2004/0027662 A1* | 2/2004 | Kurioka et al. | 359/449 |
| 2004/0105132 A1* | 6/2004 | Sunaga | 358/474 |

FOREIGN PATENT DOCUMENTS

| | | |
|---|---|---|
| EP | 1 291 681 A1 | 3/2003 |
| JP | 8-292371 | 11/1996 |
| JP | 8-292372 | 11/1996 |
| JP | 9-5650 | 1/1997 |
| JP | 9-222561 | 8/1997 |
| JP | 9-258105 | 10/1997 |
| JP | 2001-215412 | 8/2001 |
| JP | 2001-255462 | 9/2001 |

* cited by examiner

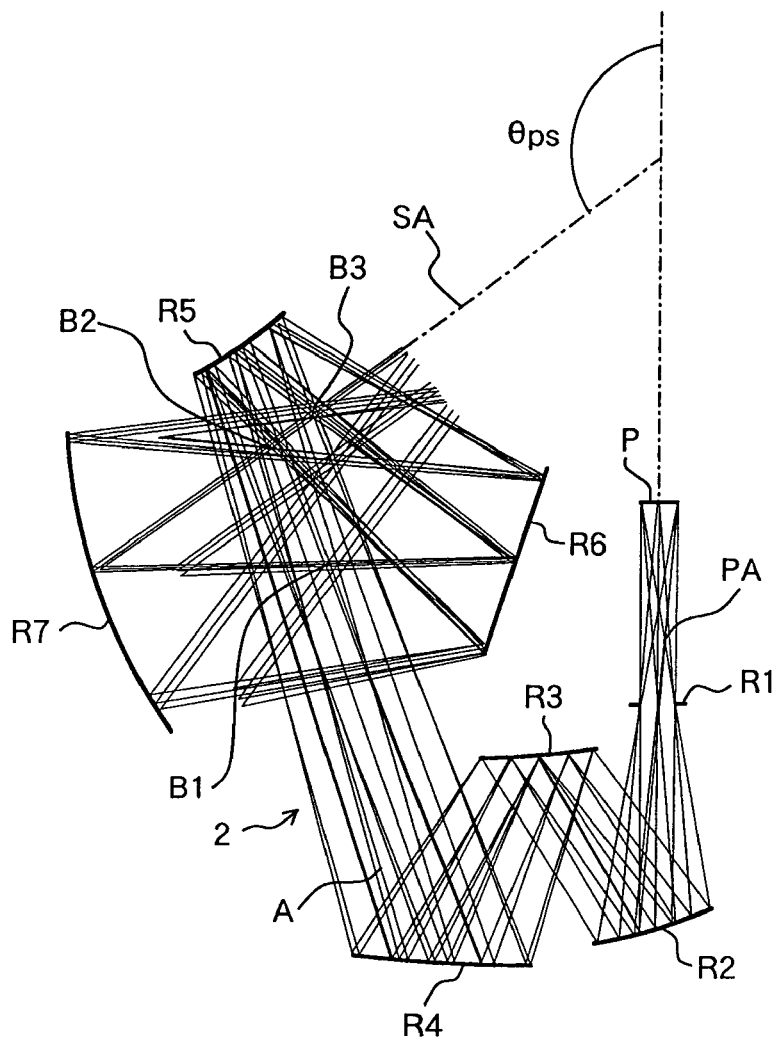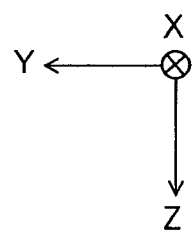
FIG. 6

PROJECTION OPTICAL SYSTEM, PROJECTION TYPE IMAGE DISPLAY APPARATUS, AND IMAGE DISPLAY SYSTEM

BACKGROUND OF THE INVENTION

1. Field of the Invention

The present invention relates to a projection optical system for use in a projection type image display apparatus such as a front projector and a rear projector.

2. Description of Related Art

FIG. 14 shows an exemplary reflective optical system proposed in Japanese Patent Application Laid-Open No. H08(1996)-292371. In FIG. 14, luminous flux from an object, not shown, passes through an aperture stop (AS) and is incident on a reflective optical element RE from a first surface R1. The luminous flux incident on the reflective optical element RE is refracted by the first surface R1, reflected by a second surface R2, a third surface R3, a fourth surface R4, a fifth surface R5, and a sixth surface R6, and refracted by a seventh surface R7 before it emerges from the reflective optical element RE. In this event, the luminous flux is primarily focused on an intermediate image forming surface near the second surface R2 and forms a pupil near the fifth surface R5.

The luminous flux emerging from the reflective optical element RE is finally focused on an image-pickup surface (an image-pickup surface of an image-pickup means such as a CCD or a CMOS sensor) IPS.

The optical system employs the optical element which has the plurality of curved or flat reflecting surfaces formed integrally to achieve a reduction in size of the overall reflective optical system. It is also possible to alleviate degraded optical performance due to low accuracy of arrangement of mirrors (assemble accuracy) which is often seen in a reflective optical system formed of mirrors arranged individually.

The optical system also has the aperture stop disposed closest to the object and is configured to focus the object image at least once within the optical system, thereby reducing the effective diameter of the reflective optical element while a wide field angle is provided. In addition, appropriate reflective power is provided for the plurality of reflecting surfaces constituting the optical element and the respective reflecting surfaces are decentered. Thus, the optical path in the optical system is bent in a desired shape to achieve a reduction in the overall length of the optical system.

Such a non-coaxial optical system is called an off-axial optical system. The off-axial optical system is defined as an optical system which, when the path of a central principal ray which passes from the center of the image and the center of the pupil is considered as a reference axis, includes a curved surface (an off-axial curved surface) to which the normal line at the intersection of the reference axis and the surface is not on the reference axis. The reference axis of the off-axial optical system is shaped to have turns.

In the off-axial optical system, constituent surfaces are typically non-coaxial and no vignetting occurs in the reflecting surfaces, so that it is easy to construct an optical system with reflecting surfaces. Japanese Patent Application Laid-Open No. H08(1996)-292372, Japanese Patent Application Laid-Open No. H09(1997)-222561, Japanese Patent Application Laid-Open No. H09(1997)-258105 and the like each have proposed a variable magnification optical system which employs such an optical element. Japanese Patent Application Laid-Open No. H09(1997)-5650 proposes a design method therefor.

Japanese Patent Application Laid-Open No. 2001-255462 (corresponding to U.S. Patent Application Publication No. 2002-008853) has proposed application of the off-axial optical system to a projection optical system of a projection type image display apparatus. FIG. 15 shows the projection optical system proposed in Japanese Patent Application Laid-Open No. 2001-255462. In FIG. 15, L shows the projection optical system, PA shows an incident side reference axis of the projection optical system L, SA shows an emerging side reference axis of the projection optical system L, and θps shows an angle between the reference axes PA and SA.

In the projection optical system, luminous flux from a light valve LV is projected onto a screen, not shown, in a direction which is oblique to the screen.

In this manner, most projectors allow oblique projection to provide improved visibility for viewers. In other words, the angle θps in FIG. 15 generally is large to a certain degree.

When a projector is not only disposed on a desk but also disposed on a floor or suspended from a ceiling in use, a larger angle is required for the angle θps. A projection optical system for use in a rear projector or the like also achieves a reduction in thickness of the overall apparatus by projecting luminous flux onto a screen from behind in a direction which is oblique to the screen. As the angle of the projection with respect to the normal line to the screen is larger, the apparatus has a smaller thickness. The angle θps is also increased in this case.

As shown in FIG. 16, an optical system proposed in Japanese Patent Application Laid-Open No. H08(1996)-292371 or the like has reflecting surfaces arranged such that, when a counterclockwise direction is defined as positive, a reference axis is rotated in the positive direction at a first reflecting surface R101, in a negative direction at a second reflecting surface R102, in the positive direction at a third reflecting surface R103, and finally in the negative direction at a fourth reflecting surface R104. In short, the reflecting surfaces are disposed such that the angles between the reference axis and the respective reflecting surfaces are formed alternately in the order of positive, negative, positive, negative and so on.

When a small angle is formed between the incident side reference axis PA and the emerging side reference axis SA, no problem occurs in that arrangement of the surfaces. However, the arrangement has disadvantages if a rather large angle is formed between the incident side reference axis and the emerging side reference axis as in the projector.

FIG. 17(A) shows a plurality of reflecting surfaces arranged to direct the emerging side reference axis SA downward. As shown in FIG. 17(A), ξ1 represents an angle between the incident side reference axis PA and the reference axis from the first reflecting surface R101 to the second reflecting surface R102. An angle ξ3 between the reference axis from the second reflecting surface R102 to the third reflecting surface R103 and the reference axis from the third reflecting surface R103 to the fourth reflecting surface R104 is increased, while ξ2 between the reference axis from the first reflecting surface R101 to the second reflecting surface R102 and the reference axis from the second reflecting surface R102 to the third reflecting surface R103 is reduced, and ξ4 between the reference axis from the third reflecting surface R103 to the fourth reflecting surface R104 and the emerging side reference axis SA is reduced.

An excessive reduction in the angles ξ2 and ξ4, however, causes interference of luminous flux, so that these angles cannot be reduced significantly. In other words, the angles ξ1 and ξ3 need to be increased.

In general, excellent performance is difficult to achieve when the angle between the reference axis and a reflecting surface is increased. If a large angle is required between the incident side reference axis and the emerging side reference axis, the angles ξ1 and ξ3 are increased and thus a required level of performance cannot be provided. In addition, when the angle between incidence and emerging of light is large at a reflecting surface, the optical system is susceptible to holding errors.

FIGS. 18(A) and 18(B) show the influence of errors at different angles between incident and emerging of light at a reflecting surface. In FIGS. 18(A) and (B), A shows a light ray incident on the reflecting surface. FIG. 18(A) shows a large angle between incidence and emerging of the ray, while FIG. 18(B) shows a small angle between incidence and emerging of the ray.

A dotted line R represents the position of the reflecting surface based on designed values. A solid line R' represents the position of the reflecting surface shifted by a length α from the position R to the right in FIGS. 18(A) and 18(B). β and γ show displacements of a hit point at which the light ray A hits the reflecting surface when the reflecting surface is shifted by the length α from the position R. As seen from FIGS. 18(A) and 18(B), the displacement β of the hit point at the large angle shown in FIG. 18(A) is larger than the displacement γ in FIG. 18(B) and demonstrates a greater influence on optical performance.

In this manner, even with the same position error of the reflecting surface, optical performance is more likely to degrade as the angle between incidence and emerging of the ray at the reflecting surface is larger.

FIG. 17(B) shows reflecting surfaces arranged to direct the emerging side reference axis SA upward. In this case, it is necessary to reduce angles ξ1 and ξ3 and increase angles ξ2 and ξ4. Similarly to the case shown in FIG. 17 (A), there is a limit to the extent of the reduction in the angles ξ1 and ξ3, and the angles ξ2 and ξ4 are inevitably increased more than necessary.

In this manner, simply increasing the tilt angle of the reflecting surface cannot readily increase the angle between the incident side reference axis and the emerging side reference axis. If the angle is larger than 30 degrees, a required level of performance cannot be ensured.

SUMMARY OF THE INVENTION

It is an object of the present invention to provide a projection optical system which has a plurality of reflecting surfaces, in which a sufficiently large angle can be ensured between an incident side reference axis and an emerging side reference axis while tilt angles of the respective reflecting surfaces can remain small.

To achieve the object, according to one aspect of the present invention, provided is a projection optical system which projects luminous flux from an image forming element which forms an original image onto a projection surface. The projection optical system has a reference axis which is defined as a path of a central principal ray which is a principal ray of luminous flux from the center of the original image to the center of an image of the original image projected on the projection surface. The reference axis on an incident side and the reference axis on an emerging side of the projection optical system are oblique (inclined) to each other. The projection optical system comprises at least three reflecting surfaces each having a curvature. The plurality of reflecting surfaces are arranged such that the reference axis has at least one intersection in the projection optical system.

These and other characteristics of the projection optical system, projection type image display apparatus and image display system according to the present invention will be apparent from the following description of specific embodiments with reference to the drawings.

BRIEF DESCRIPTION OF THE DRAWINGS

FIG. 6 is an enlarged view of the projection optical system shown in FIG. 5;

DETAILED DESCRIPTION OF THE PREFERRED EMBODIMENTS

Figure 13:
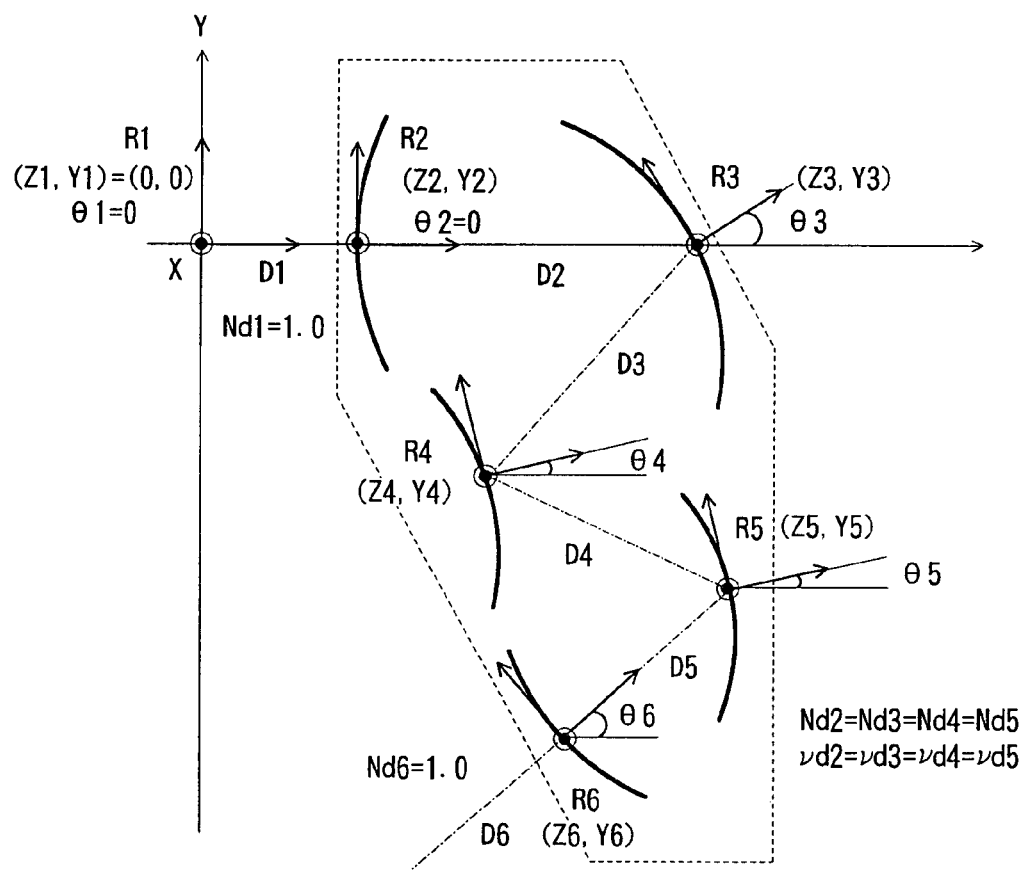
FIG. 13 is an explanatory view of a coordinate system for use in Embodiments 1 to 3 of the present invention.
Figure 14:
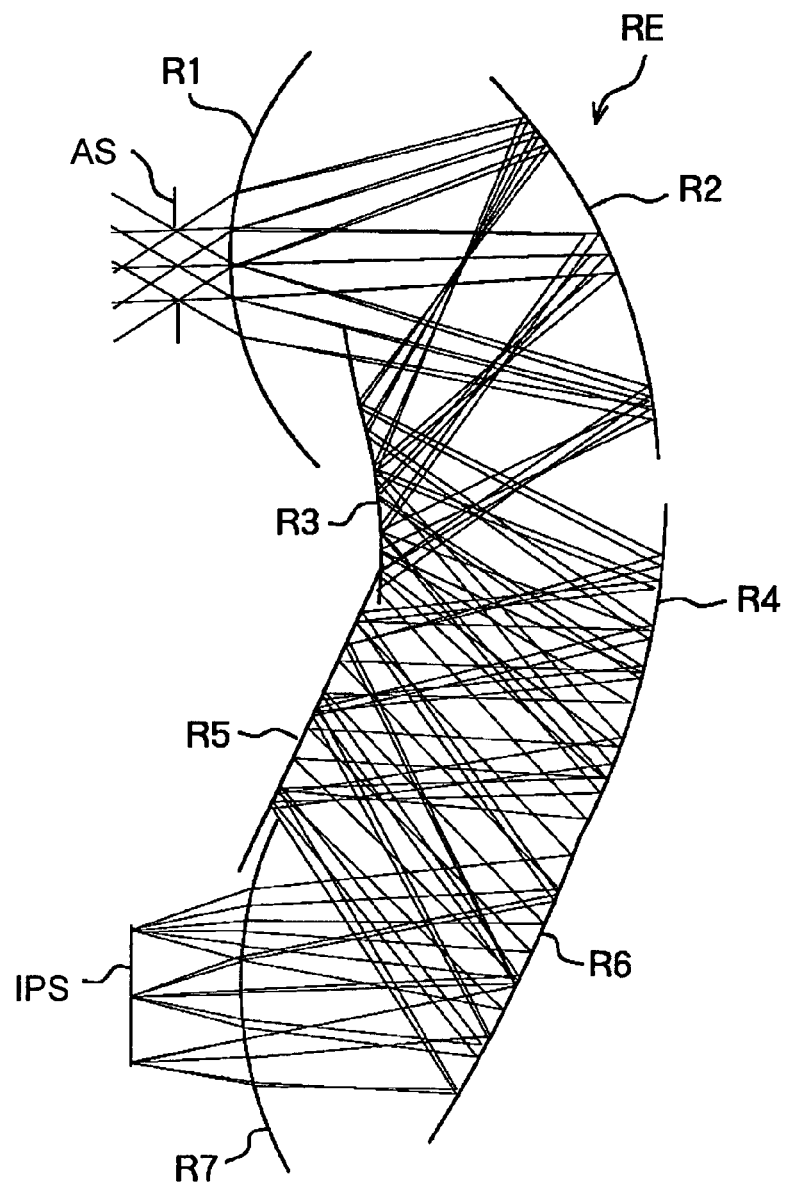
FIG. 14 is a section view of a conventional projection optical system in a YZ plane.
Figure 15:
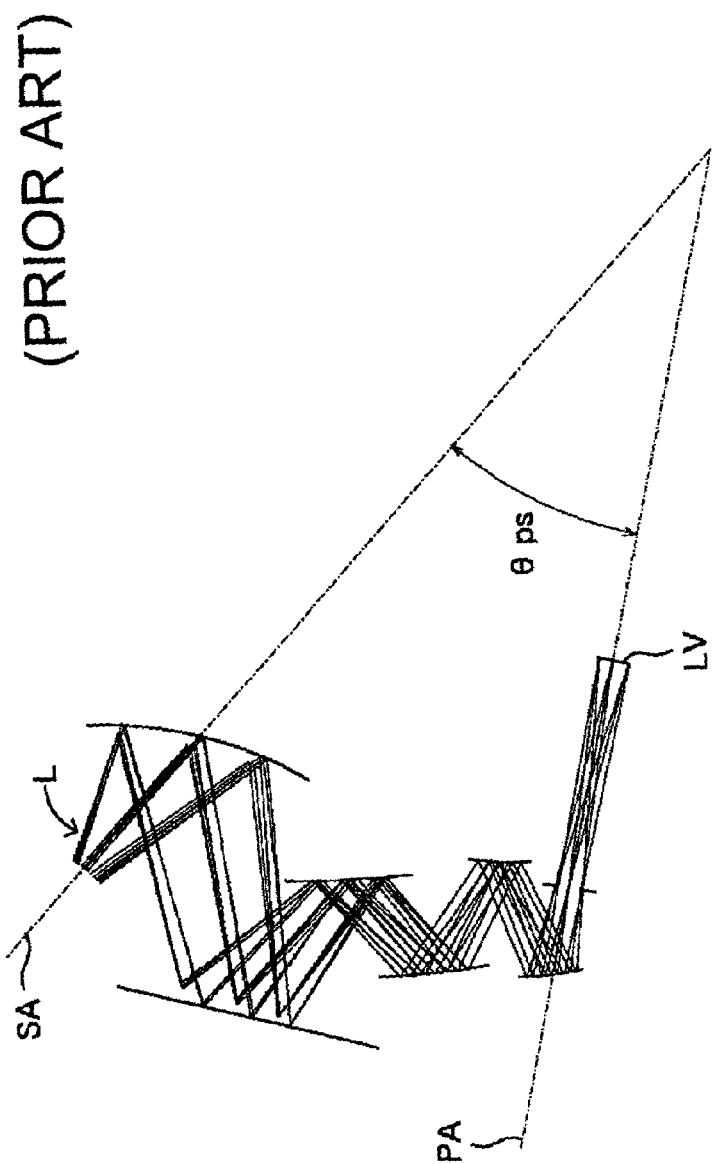
FIG. 15 is a section view of a conventional projection optical system using reflecting surfaces in a YZ plane.
Figure 16:
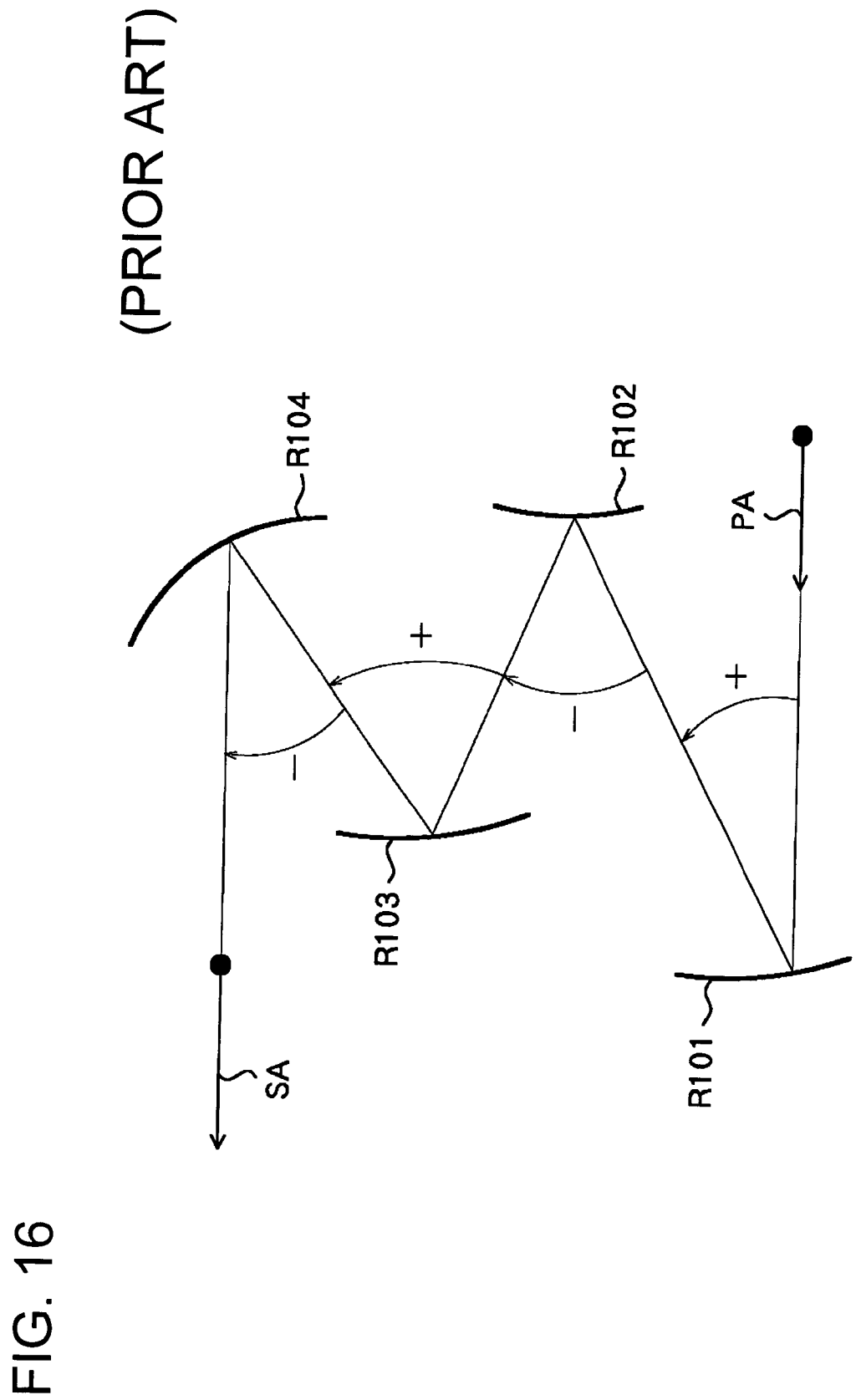
FIG. 16 is a schematic diagram of a conventional projection optical system.
Figure 17A:
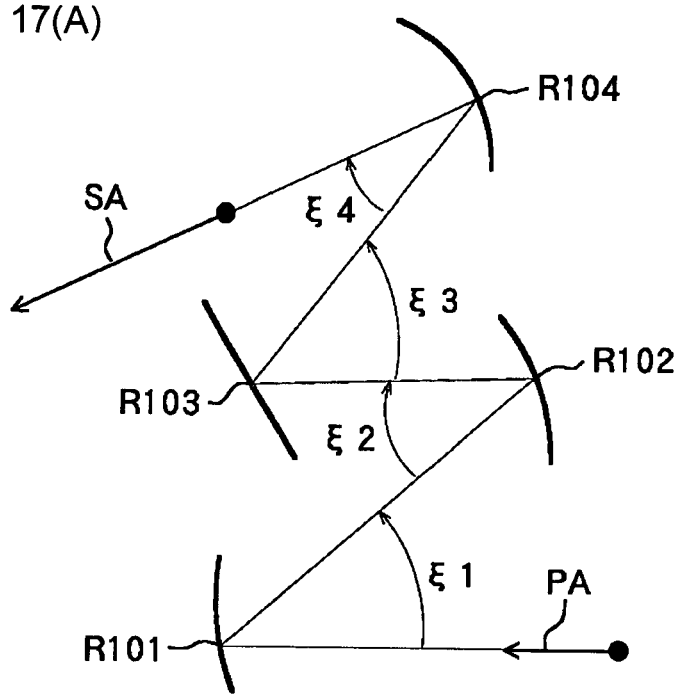
FIG. 17 (A) is a schematic diagram of a plurality of reflecting surfaces in which an incident side reference axis of the projection optical system is directed downward.
FIG. 17(B) is a schematic diagram of the plurality of reflecting surfaces in which the incident side reference axis of the projection optical system is directed upward.
Figure 17B:
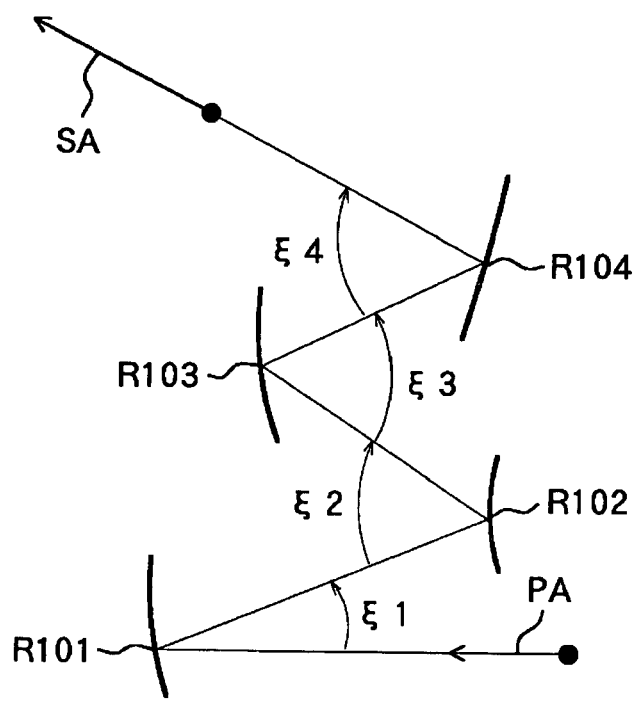
Figure 18:
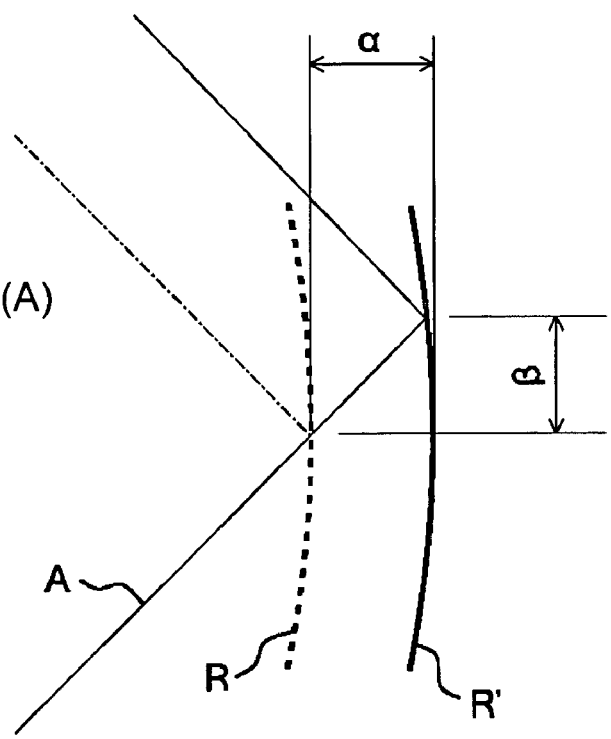
FIGS. 18(A) and 18(B) are schematic diagrams for explaining the relationship between a displacement of a hit point and an angle between incidence and emerging of a light ray at a reflecting surface.
Figure 18:
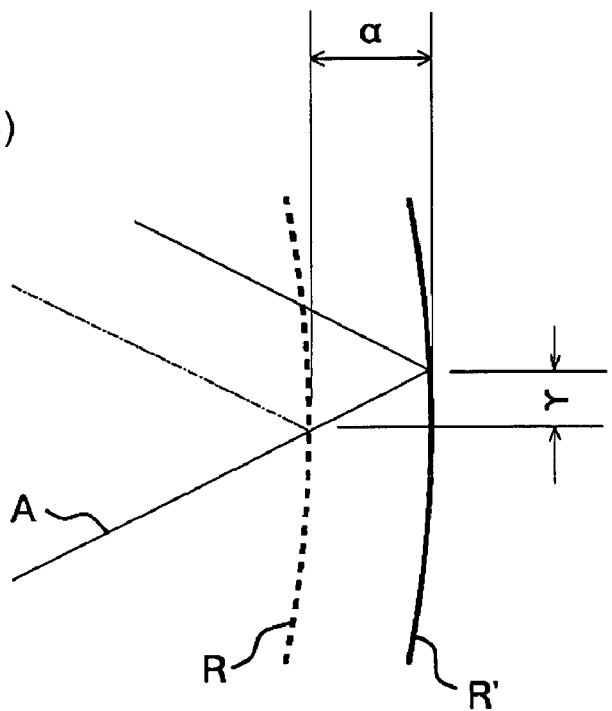

Prior to description of Embodiments of the present invention, description is made for how to represent features in each Embodiment and matters common to all of Embodiments. FIG. 13 is an explanatory view of a coordinate system for defining data representing optical systems which are shown as Embodiments of the present invention.

In Embodiments of the present invention, each surface along a light ray traveling from an object side (an original image side) to an image forming surface (a projection surface) (the ray is shown as a dash dotted line in FIG. 13 and referred to as "a central principal ray" or "a reference axis ray") is designated in order as "an i-th surface."

In FIG. 13, a first surface R1 is an aperture stop, a second surface R2 is a refracting surface coaxial with the first surface R1, a third surface R3 is a reflecting surface tilted with respect to the second surface R2, a fourth surface R4 and a fifth surface R5 are reflecting surfaces shifted and tilted with respect to their preceding surfaces, and a sixth surface R6 is a refracting surface shifted and tilted with respect to the fifth surface R5. Each of the second surface R2 to the sixth surface R6 is formed on a single optical element made of a medium such as glass and plastic.

In FIG. 13, the medium from an object plane, not shown, to the second surface R2 is made of air, the media from the second surface R2 to the sixth surface R6 are made of a common medium, and the medium from the sixth surface R6 to a seventh surface R7, not shown, is made of air.

Since the optical system of the present invention is an off-axial optical system, the respective surfaces constituting the optical system do not have a common optical axis. Thus, in Embodiments of the present invention, an absolute coordinate system is defined such that the center of the effective diameter of the first surface R1 is set as its origin.

In Embodiments of the present invention, the central point of the effective diameter of the first surface is defined as the origin, and the path of a light ray (the central principal ray or the reference axis ray) passing through the origin and the center of a final imaging surface (finally formed image) is defined as a reference axis of the optical system. When an original image formed on an image forming element disposed at the object surface is also considered, the reference axis is defined as the path of the principal ray of luminous flux passing through the central of the original image, the center of the pupil of the optical system, and the center of the finally formed image, that is, the central principal ray (or the reference axis ray). The reference axis in Embodiments has a direction. The direction is the traveling direction of the central principal ray in forming an image.

While the reference axis serving as the reference of the optical system is defined as described above in Embodiments of the present invention, an convenient axis may be determined as the reference axis serving as the reference of the optical system from the viewpoints of optical design, aberration correction, or representation of the shapes of respective surfaces constituting the optical system. Typically, however, the path of the light ray passing through the center of the image surface and the center of the aperture stop, an entrance pupil, an exit pupil, the first surface of the optical system, or the final surface is defined as the reference axis serving as the reference of the optical system.

Thus, in Embodiments of the present invention, the reference axis is set as the path of the central principal ray (the reference axis ray) subjected to refraction and reflection by each refracting surface and reflecting surface while the ray passes from the center of the effective diameter of the first surface (the aperture stop) to the center of the final imaging surface. The respective surfaces are arranged in the order in which the central principal ray is subjected to the refraction and reflection. Thus, the reference axis finally reaches the center of the image surface after its direction is changed in accordance with the refraction or reflection rule in the set order of the respective surfaces.

All the tilted surfaces forming part of the optical system of Embodiments of the present invention are basically tilted in the same plane. Thus, as shown in FIG. 13, each axis of the absolute coordinate system is defined as follows.

Z axis: the reference axis passing through the origin toward the second surface R2, and the direction from the origin toward the second surface R2 is defined as positive.

Y axis: the direction of a straight line passing through the origin and forming an angle of 90 degrees counterclockwise with respect to the Z axis in the tilt plane (in the sheet of FIG. 13).

X axis: the direction of a straight line passing through the origin and perpendicular to each of the Z, Y axes (the direction perpendicular to the sheet of FIG. 13, and the direction away from the sheet is defined as positive), and specifically, the direction rotated about the origin by 90 degrees counterclockwise with respect to the Y axis viewed from the positive direction of the Z axis.

For representing the shape of an i-th surface forming part of the optical system, it is easier to recognize the shape by setting a local coordinate system in which the intersection of the reference axis and the i-th surface is set as its origin and representing the shape of the surface in the local coordinate system, rather than by representing the shape of the surface in the absolute coordinate system. Thus, the shape of the i-th surface is represented in the local coordinate system. In the local coordinate system, x, y, and z axes are defined as follows.

z axis: the direction of the normal line to the i-th surface at the origin of the local coordinate system. The direction forming an angle smaller than 90 degrees with respect to the Z direction of the absolute coordinate system is defined as positive.

y axis: the direction of a straight line passing through the origin of the local coordinate system and rotated by 90 degrees counterclockwise with respect to the z direction in the YZ plane of the absolute coordinate system is defined as positive.

x axis: the direction of a straight line passing through the origin of the local coordinate system and perpendicular to the YZ plane (the direction rotated about the origin by 90 degrees counterclockwise with respect to the y axis viewed from the positive direction of the z axis is defined as positive).

A tilt angle of the i-th surface in the YZ plane is represented by an angle $\theta_i$ (in degrees (°)) when the counterclockwise direction is defined as positive with respect to the Z axis of the absolute coordinate system. The angle $\theta_i$ means the counterclockwise tilt angle of the z axis of the i-th surface in the YZ plane with respect to the Z axis of the absolute coordinate system. In other words, the y and z axes of the local coordinate system (x, y, z) of the i-th surface are inclined by angle $\theta_i$ in the YZ plane with respect to the absolute coordinate system (X, Y, Z). In Embodiments of the present invention, the origin of the local coordinate system of each surface is on the YZ plane of the absolute coordinate system. In Embodiments of the present invention, no decentering of the surface exists in the XZ and ZY planes.

In Embodiments of the present invention, numerical data is shown with section views of the optical systems. In the data, $Y_i$ and $Z_i$ represent coordinates of the origin of each reflecting surface in the absolute coordinate system. $\theta_i$ represents the tilt angle of each reflecting surface. $D_i$ represents a scalar quantity indicating the spacing between the origins of the local coordinate system of an i-th surface and a (i+1) surface. Ndi, υdi represent a refractive index and an Abbe number of the medium between the i-th surface and the (i+1) surface, respectively. In addition, e-X represents $10^{-X}$.

A spherical surface is a shape represented by the following expression.

$$z = \frac{(x^2 + y^2)/Ri}{1 + \{1 - (x^2 + y^2)/Ri^2\}^{1/2}}$$

The optical system of the present invention has at least three aspheric surfaces which are rotationally asymmetric, and its shape is represented by the following expression:

$z=C02y^2+C20x^2+C03y^3+C21x^2y+C04y^4+C22x^2y^2+C40x^4+C05y^5+C23x^2Y^3+C41x^4y+C06y^6+C24x^2y^4+C42x^4y^2+C60x^6$

Since the above expression of the curved surface has only even-numbered order terms for x, the curved surface defined by the above curved surface expression is a plane-symmetric shape which has the yz plane as a plane of symmetry. In addition, a symmetric shape with respect to the xz plane is represented when the following condition is satisfied:

$C03=C21=t=0$

Furthermore, a rotationally symmetric shape is represented when the following is satisfied, or a rotationally asymmetric shape is represented when the following is not satisfied:

$C02=C20$ $C04=C40=C22/2$ $C06=C60=C24/3=C42/3$

In each of Embodiments, the diameter of the aperture stop is shown as an aperture diameter. This relates to brightness of the optical system. Also, in Embodiments, lateral aberration of the projection optical system is shown in figures. Specifically, lateral aberration is shown for luminous flux of field angles 1 to 6 represented by:

(0,VS/2),(0,0),(0,-VS/2),(HS/2,VS/2),(HS/2,0),(HS/2,-VS/2)

where the center of an image is defined as an origin on an image forming surface, VS represents the size of the image forming surface in a vertical direction (Y direction), and HS represents the size of the image forming surface in a horizontal direction (X direction).

In the figures of the lateral aberration, the horizontal direction represents the height of incidence on a pupil, while the vertical direction represents an amount of aberration. For each field angle, two graphs are provided to show the lateral aberration for a y section and an x section on the entrance pupil plane.

In each of Embodiments, each surface basically has a plane-symmetric shape which has the yz plane as a plane of symmetry. Thus, positive and negative values are the same in the horizontal direction in the figures of lateral aberration, and a graph of lateral aberration for the negative values is omitted.

(Embodiment 1)

Figure 1:
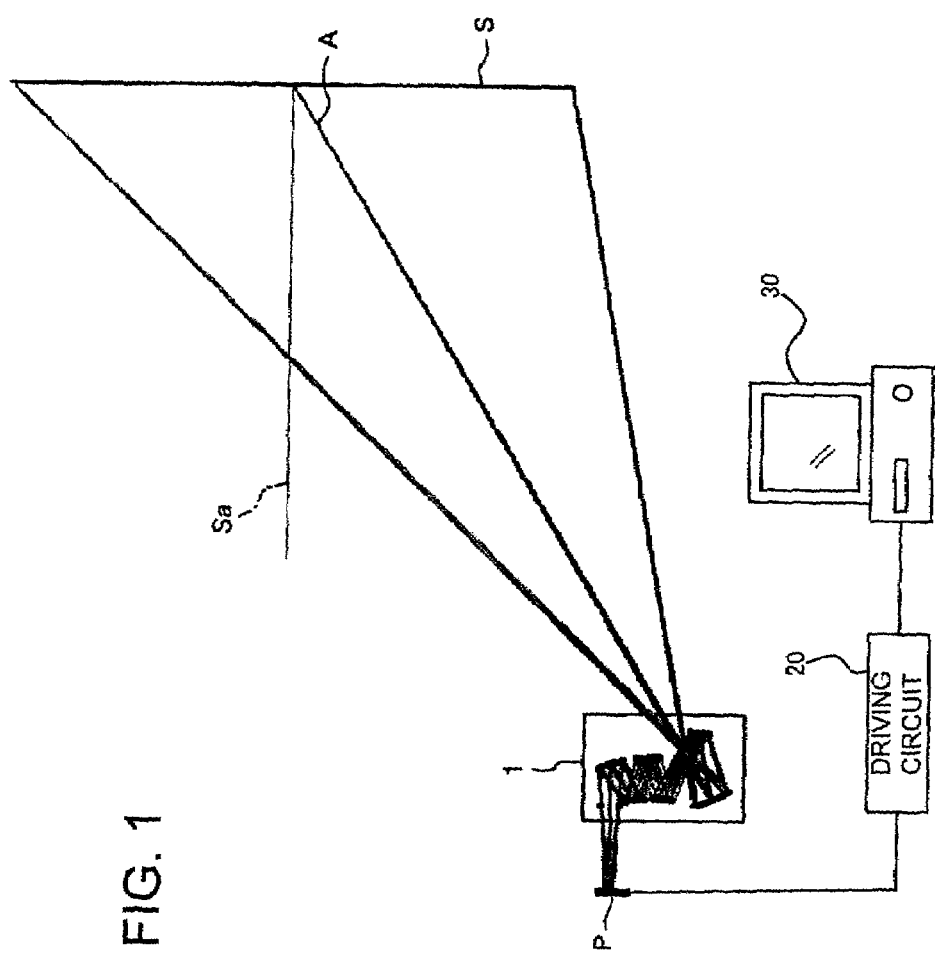
FIG. 1 shows the overall structure of all optical systems of a projector including a projection optical system which is Embodiment 1 of the present invention, in a YZ plane.
Figure 2:
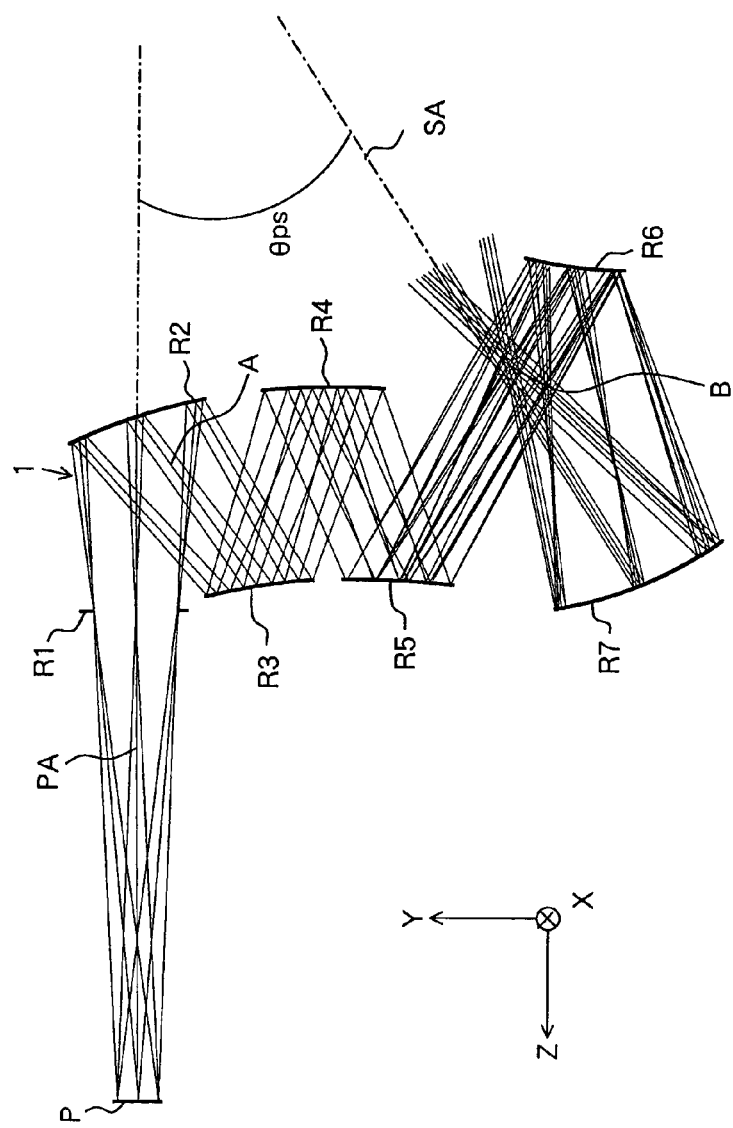
FIG. 2 is an enlarged view of the projection optical system shown in FIG. 1.

FIG. 1 shows all optical systems of a projector (a projection type image display apparatus) including a projection optical system which is Embodiment 1 of the present invention. FIG. 2 shows the structure of the projection optical system.

In FIGS. 1 and 2, P shows an image forming element for which a reflective type dot matrix liquid crystal display, a digital micromirror device (DMD), a self-light-emitting element (such as an organic electroluminescence element) or the like is used. Reference numeral 1 shows the projection optical system for enlargingly projecting an original image formed on the image forming element P onto a screen S.

A driver circuit 20 is connected to the image forming element P for driving thereof. Connected to the driving circuit 20 is an image information supply apparatus 30 such as one of various computers, a camera (a video camera, a digital camera or the like), a VCR, a cellular phone, and a radio wave receiver (wired or wireless). An image display system comprises the projector of Embodiment 1 and the image information supply apparatus 30.

The image information supply apparatus 30 supplies the driving circuit 20 image information for the image forming element P to form an original image to the driving circuit 20. The driving circuit 20 drives the image forming element P in response to the supplied image information to allow the image forming element P to form the original image. This feature is also used in Embodiments 2 and 3, although not shown.

The image forming element P has a size of 9.6 mm×7.2 mm, and the screen S has a size of 30 inches diagonally with an aspect ratio of 4:3. A normal line Sa to the screen S is inclined by 32 degrees with respect to the reference axis A. As shown in FIG. 2, an angle of θps 32 degrees is formed between the reference axis on an incident side of the projection optical system (incident side reference axis PA) and the reference axis on an emerging side of the projection optical system (emerging side reference axis SA).

In Embodiment 1, the reference axis A has an intersection B in the projection optical system 1. When the reference axis A has an intersection, a rather large spacing is required between reflecting surfaces and the size of reflecting surfaces is increased. The larger reflecting surfaces make it difficult to hold the reflecting surfaces with high accuracy. Thus, an intermediate image is formed within the projection optical system 1. This also applies to Embodiments 2 and 3, later described.

In the following, data for representing the projection optical system used in Embodiment 1 is shown.

Aperture Stop Diameter 14.00 (mm)

i Yi Zi θi Di Ndi υdi 1 0.00 0.00 0.00 32.26 1 aperture stop
2 0.00 32.26 18.00 35.00 1 reflecting surface
3 −20.57 3.94 9.00 35.00 1 reflecting surface
4 −31.39 37.23 2.00 35.00 1 reflecting surface
5 −44.50 4.78 −3.00 60.00 1 reflecting surface
6 −72.67 57.76 −8.00 55.00 1 reflecting surface
7 −84.10 3.96 22.00 663.41 1 reflecting surface
8 267.45 566.57 0.00 1 image surface Aspheric Shape R2
  C02=−4.59271e-003    C20=−5.14835e-003
  C03=−3.36691e-006    C21=−9.05752e-006
  C04=−2.08970e-007    C22=−5.43739e-007
  C40=−1.68410e-007
  C05=−2.72326e-010  C23=1.14750e-009  C41=1.49991e-009
  C06=−3.53363e-011    C24=−8.68835e-011
  C42=1.83016e-011
  C60=3.67053e-012

R3

$C02=-3.28358e-003$ $C20=-2.60698e-003$
$C03=2.73314e-007$ $C21=2.33331e-005$
$C04=-8.49903e-007$ $C22=-2.77483e-006$
$C40=-3.75307e-007$
$C05=4.82906e-010$ $C23=3.70575e-008$ $C41=4.46750e-008$
$C06=-4.54160e-010$ $C24=-1.25191e-009$
$C42=4.80080e-010$
$C60=1.24882e-010$

R4

$C02=-1.74583e-003$ $C20=-1.12421e-003$
$C03=1.93011e-005$ $C21=1.63608e-004$
$C04=-4.84555e-007$ $C22=-5.33392e-007$
$C40=-3.39986e-007$
$C05=-4.50332e-009$ $C23=9.81373e-009$ $C41=3.58771e-008$
$C06=-2.44207e-010$ $C24=-2.16186e-010$
$C42=2.39454e-009$
$C60=6.13703e-010$

R5

$C02=-4.33194e-004$ $C20=-6.40212e-003$
$C03=4.31579e-005$ $C21=4.76324e-004$
$C04=-6.06041e-007$ $C22=-8.47399e-006$
$C40=-3.66199e-006$
$C05=-2.85310e-009$ $C23=1.44521e-007$ $C41=3.32388e-007$
$C06=-1.62005e-010$ $C24=-7.23296e-010$
$C42=-1.29510e-008$
$C60=8.90773e-010$

R6

$C02=4.38588e-003$ $C20=1.61685e-003$
$C03=5.90286e-005$ $C21=2.35775e-004$
$C04=-1.99181e-006$ $C22=6.55543e-006$
$C40=-5.60326e-007$
$C05=-1.45852e-009$ $C23=2.02194e-009$ $C41=2.36886e-007$
$C06=2.08528e-009$ $C24=3.83403e-009$ $C42=7.76936e-009$
$C60=4.32004e-009$

R7

$C02=8.29142e-003$ $C20=6.93803e-003$
$C03=4.87359e-005$ $C21=4.64618e-005$
$C04=6.54790e-007$ $C22=-7.17921e-008$ $C40=1.06696e-007$
$C05=5.77959e-009$ $C23=1.10825e-008$ $C41=4.05398e-009$
$C06=1.61873e-010$ $C24=1.45878e-010$ $C42=3.76594e-011$
$C60=2.40730e-011$

In FIGS. 1 and 2, the projection optical system 1 is composed of an aperture stop R1 and six reflecting surfaces including a concave mirror R2, a convex mirror R3, a concave mirror R4, a convex mirror R5, a convex mirror R6, and a concave mirror R7, in the order in which rays from the image forming element P pass through.

All the reflecting surfaces are symmetrical only with respect to the YZ plane. The luminous flux forms an intermediate image between the convex mirror R6 and the concave mirror R7, is reflected by the concave mirror R7, and then forms a pupil image. In addition, an optical path from the convex mirror R5 to the convex mirror R6 intersects with an optical path from the concave mirror R7. In other words, the reference axis A has the intersection B within the projection optical system 1. The luminous flux reflected by the concave mirror R7 which is the final reflecting surface passes through the space between the concave mirror R4 and the convex mirror R6 and then is projected onto the screen S (shown in FIG. 1).

In Embodiment 1, the angle between the normal line to each reflecting surface and the reference axis A is as small as 27 degrees at most. In a case of a wide-angle optical system having a field angle that is 20 degrees or more such as a projector, optical surfaces are large in size since the field angle is wide, thereby making it difficult to reduce the angle. But the intersection B of the reference axis A (the optical path) in this manner can reduce the tilt angle of each reflecting surface.

Figure 19:
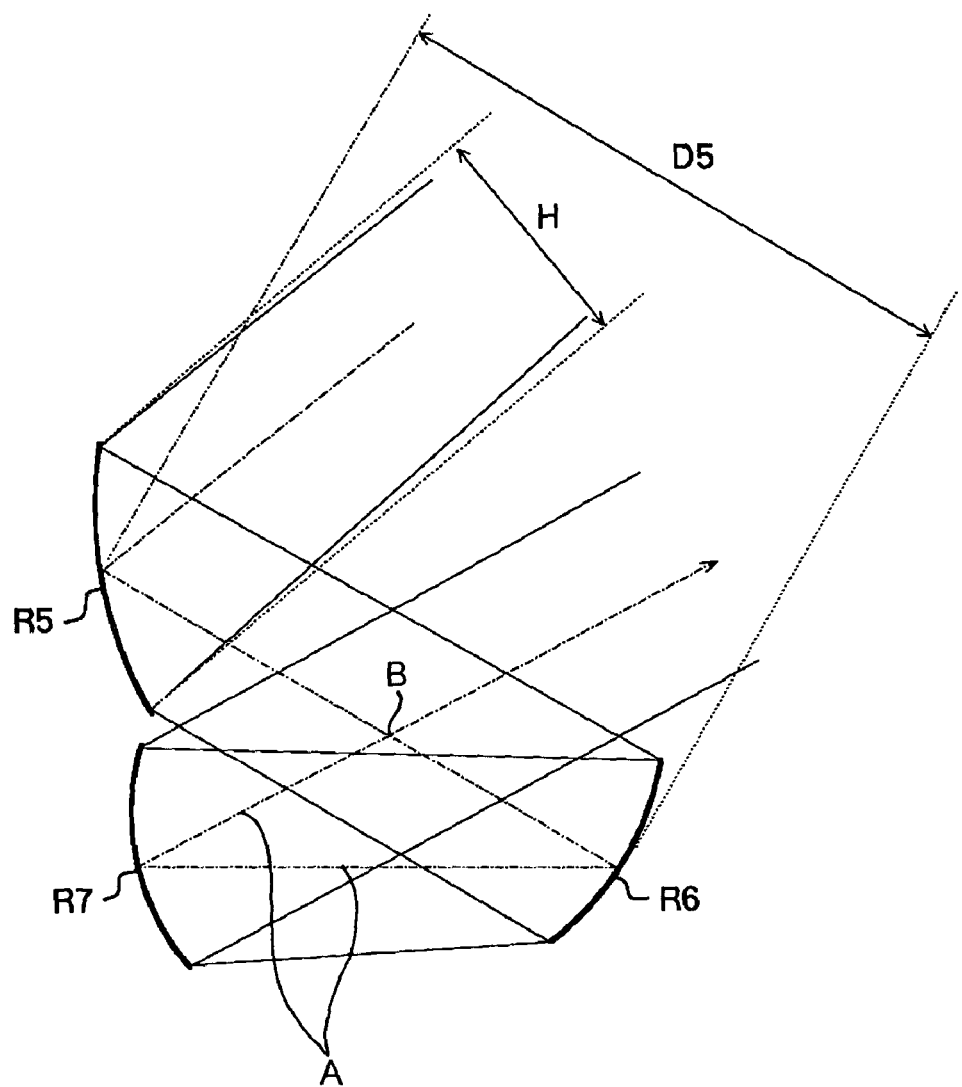
FIG. 19 is an explanatory view of a distance between reflecting surfaces.

When the reference axis has the intersection, a large spacing needs to be set between reflecting surfaces. FIG. 19 schematically shows the optical path from the convex mirror R5 to the convex mirror R6.

In FIG. 19, H shows the width of luminous flux incident on the convex mirror R5. Te width H is not changed largely throughout the optical path and has substantially the same as the intermediate image forming surface. As shown in FIG. 19, a distance D5 (a spacing between the convex mirror R5 and the convex mirror R6) which is at least 2.5 times larger than the width H must be ensured to allow for the intersection of the optical path. If the length D5 is smaller, the optical path cannot have the intersection. When the spacing between the adjacent reflecting surfaces needs to be increased in consideration of holding of the reflecting mirrors or any other reason, the spacing between adjacent surfaces must be further increased.

The size of the intermediate image is approximately 2.5 to 7 times larger than that of the image forming element (original image) in the plane (YZ plane) including the reference axis when the projection optical system is formed of mirrors (with surface reflection). After the intermediate image forming surface, at most two reflecting surfaces exist. If the aperture at the intermediate image forming surface is large, it is not possible to ensure desired performance. In other words, the brightness of the image is closely related to the size of the intermediate image forming surface.

An image forming element for use in the image-taking optical system proposed in Japanese Patent Application Laid-Open No. H08(1996)-292371 is smaller than the image forming element for use in the projection optical system and provides a darker image even with the same F number. In other words, if the size of the image forming element is larger than that in the image-taking optical system proposed in Japanese Patent Application Laid-Open No. 1996-292371, the intermediate image forming surface must be larger and its aperture must be smaller. Thus, the size of the intermediate image forming surface is approximately 2.5 to 7 times larger than the size of the image forming element in the plane including the reference axis.

Therefore, the maximum spacing between adjacent reflecting surfaces in the projection optical system needs to be at least 7 times larger than the size of the image forming element in the plane including the reference axis.

Specifically, the following expression needs to be satisfied in the aforementioned projection optical system:

$$L > 7Y \quad (1)$$

where L represents the maximum spacing between two adjacent surfaces along the reference axis of the plurality of reflecting surfaces constituting the projection optical system, and Y represents the size of the original image in the plane including the reference axis.

In Embodiment 1, the size of the image forming element in the plane including the reference axis is 7.2 mm, and the maximum spacing between two adjacent surfaces is 60 mm (which is approximately 8.33 times larger than 7.2 mm), so that the expression (1) is satisfied.

Figure 3:
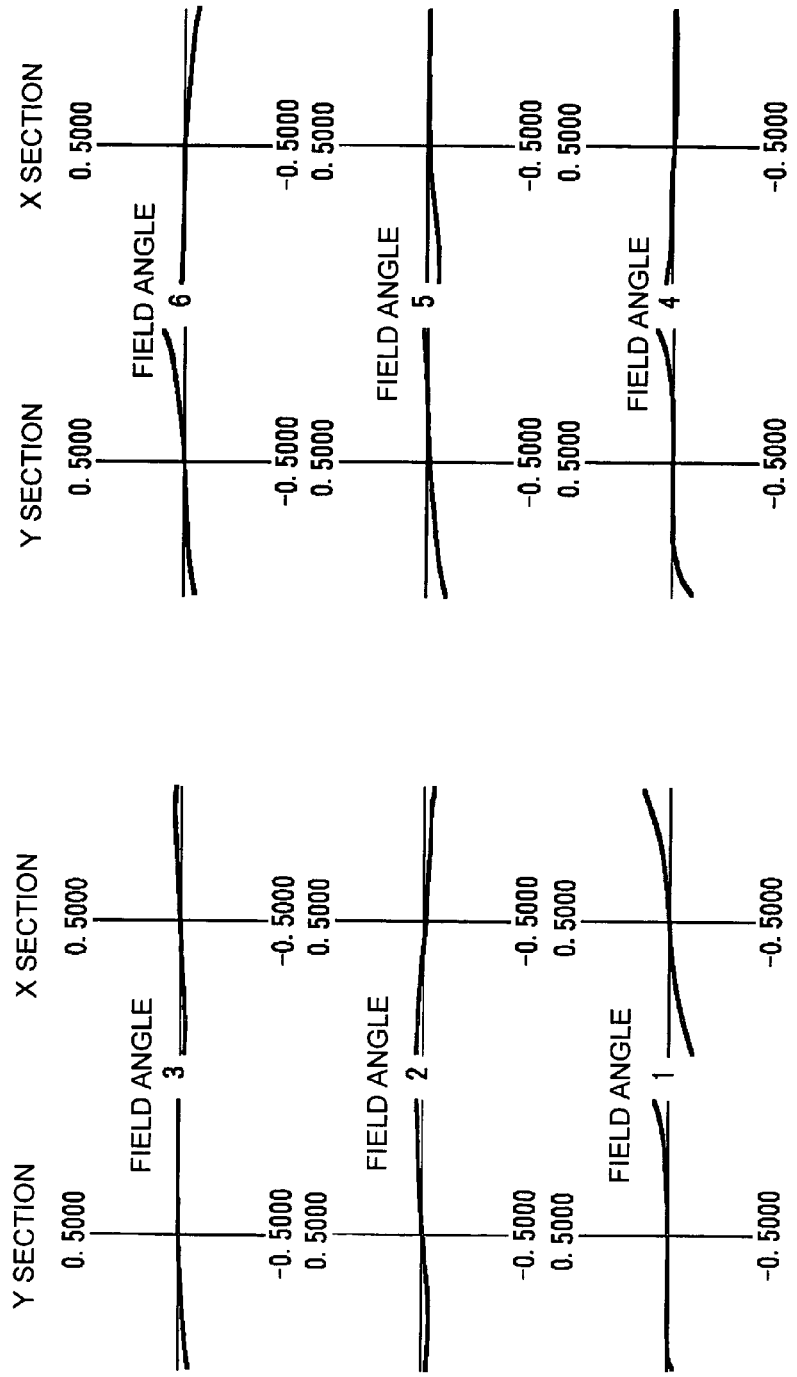
FIG. 3 shows lateral aberration of the projection optical system shown in FIG. 1.
Figure 4:
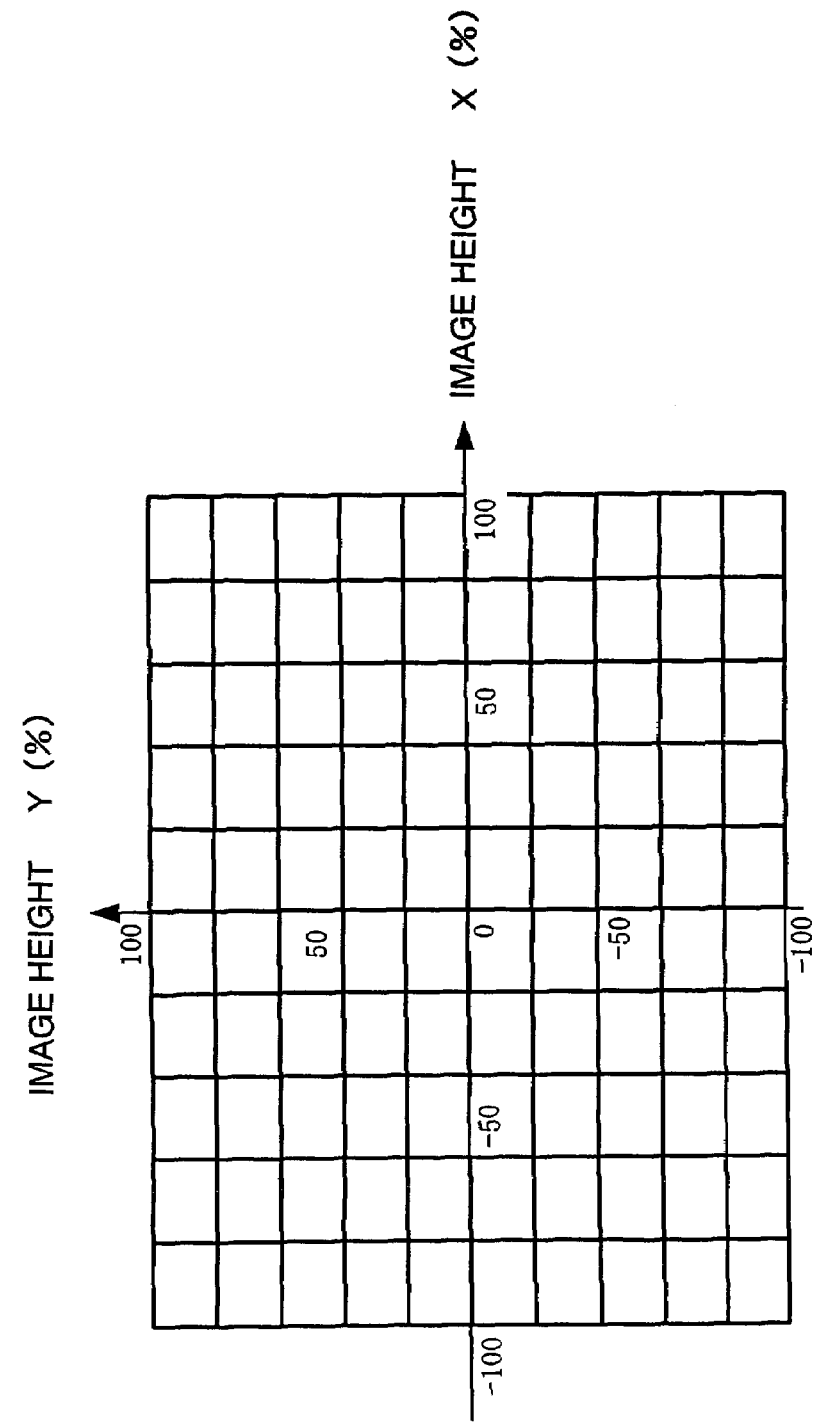
FIG. 4 shows distortion of the projection optical system shown in FIG. 1.

FIG. 3 shows lateral aberration on the screen S, and FIG. 4 shows distortion on the screen S. As seen from FIGS. 3 and 4, sufficient performance can be ensured for both of them.

(Embodiment 2)

Figure 5:
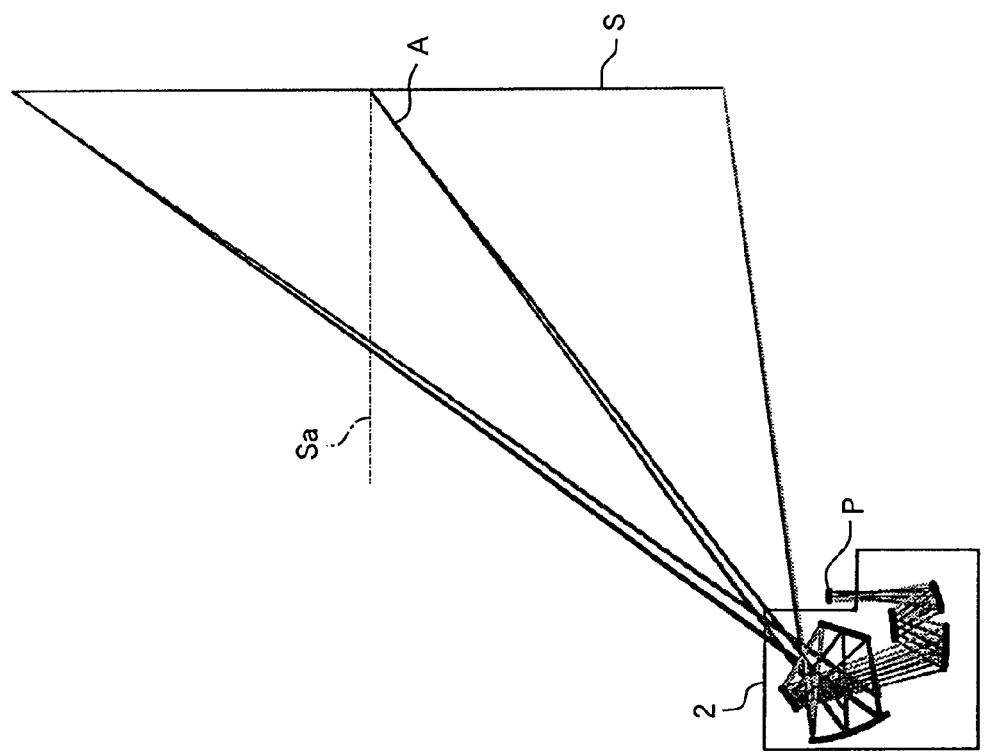
FIG. 5 shows the overall structure of all optical systems of a projector including a projection optical system which is Embodiment 2 of the present invention, in a YZ plane.

FIG. 5 shows all optical systems of a projector including a projection optical system which is Embodiment 2 of the present invention. FIG. 6 shows the structure of the projection optical system.

In FIGS. 5 and 6, P shows an image forming element for which a reflective type dot matrix liquid crystal display, a digital micromirror device (DMD), a self-light-emitting element (such as an organic electroluminescence element) or the like is used. Reference numeral 2 shows the projection optical system for enlargingly projecting an original image formed on the image forming element P onto a screen S.

In Embodiment 2, the image forming element P has a size of 17.4 mm×9.8 mm, and the screen S has a size of 60 inches diagonally with an aspect ratio of 16:9. A normal line Sa to the screen S is inclined by 36 degrees with respect to the reference axis A. The incident side reference axis PA of the projection optical system 2 forms an angle θps of 126 degrees with the emerging side reference axis SA of the projection optical system 2.

In the following, data for representing the projection optical system used in Embodiment 2 is shown.

Aperture Stop Diameter 9.00 (mm)

i Yi Zi Si Di Ni υi
1 0.00 0.00 0.00 58.98 1 aperture stop
2 0.00 58.98 −17.00 55.00 1 reflecting surface
3 30.76 13.38 −5.00 60.00 1 reflecting surface
4 55.16 68.19 3.00 170.00 1 reflecting surface
5 107.69 −93.49 −35.00 90.00 1 reflecting surface
6 36.77 −38.08 −72.00 110.00 1 reflecting surface
7 146.70 −34.24 −71.00 850.00 1 reflecting surface
8 −540.96 −533.86 −90.00 1 image surface Aspheric Shape R2
 $C02=-3.37436e-003$ $C20=-4.51239e-003$
 $C03=1.84135e-006$ $C21=2.01115e-005$
 $C04=-1.21712e-007$ $C22=-1.80598e-007$
 $C40=-9.60824e-008$
 $C05=-1.64411e-010$ $C23=2.19554e-009$ $C41=2.61499e-009$
 $C06=2.78395e-011$ $C24=4.43397e-012$ $C42=2.37055e-012$
 $C60=-3.56081e-013$ R3
 $C02=-2.76122e-003$ $C20=-3.54988e-003$
 $C03=-5.17629e-006$ $C21=1.20617e-004$
 $C04=-4.32174e-007$ $C22=-1.04423e-006$
 $C40=-3.47541e-007$
 $C05=-3.04582e-009$ $C23=2.09415e-008$ $C41=3.53532e-008$
 $C06=7.92858e-011$ $C24=-6.76769e-011$
 $C42=-8.21742e-010$
 $C60=-5.05441e-011$ R4
 $C02=-2.03074e-003$ $C20=-1.24791e-004$
 $C03=-2.34234e-006$ $C21=5.25703e-005$
 $C04=-7.49414e-008$ $C22=2.66652e-007$ $C40=1.34439e-008$
 $C05=-2.04206e-010$ $C23=1.45779e-009$ $C41=6.16235e-009$
 $C06=8.09616e-012$ $C24=2.58386e-012$ $C42=1.03269e-010$
 $C60=2.46239e-011$ R5
 $C02=-3.32067e-003$ $C20=-1.15647e-003$
 $C03=-1.27296e-005$ $C21=2.01429e-005$
 $C04=-3.78538e-007$ $C22=2.81310e-007$
 $C40=-3.80101e-008$
 $C05=-6.53647e-009$ $C23=7.14790e-010$ $C41=3.55485e-009$
 $C06=-5.57125e-010$ $C24=1.10713e-010$
 $C42=-6.12210e-011$
 $C60=2.47026e-012$ R6
 $C02=-2.08832e-004$ $C20=6.27250e-005$
 $C03=3.26988e-006$ $C21=1.21445e-006$
 $C04=1.26492e-007$ $C22=1.22400e-007$ $C40=-8.32280e-009$
 $C05=2.17274e-010$ $C23=-8.05035e-010$ $C41=9.42355e-010$
 $C06=-1.58005e-010$ $C24=4.18944e-013$
 $C42=-1.10566e-011$
 $C60=-1.77396e-012$ R7
 $C02=3.46749e-003$ $C20=3.41829e-003$
 $C03=-1.36036e-005$ $C21=-1.32919e-005$
 $C04=8.77755e-008$ $C22=8.34453e-008$ $C40=9.73084e-009$
 $C05=-3.72349e-010$ $C23=8.18783e-011$ $C41=7.67548e-011$
 $C06=1.50474e-012$ $C24=-1.71432e-012$ $C42=7.11081e-013$
 $C60=-2.21915e-013$ In FIGS. 5 and 6, the projection optical system 2 is composed of an aperture stop R1 and six reflecting surfaces including a concave mirror R2, a convex mirror R3, a concave mirror R4, a convex mirror R5, a concave mirror R6, and a concave mirror R7, in the order in which rays from the image forming element P pass through. All the reflecting surfaces are symmetrical only with respect to the YZ plane.

Luminous flux forms an intermediate image near the convex mirror R5, is reflected by the concave mirror R7, and then forms a pupil image. In addition, an optical path (a reference axis A) has three intersections B1, B2 and B3 in the space surrounded by the concave mirror R4, the convex mirror RS, and the concave mirror R6 and the concave mirror R7. The luminous flux reflected by the concave mirror R7 which is the final reflecting surface passes through the space between the convex mirror R5 and the concave mirror R6 and then is projected onto the screen S (shown in FIG. 5).

The angle between the normal line to each reflecting surface and the reference axis A is as small as 29 degrees at most. The intersections B1, B2 and B3 of the optical path (the reference axis SA) in this manner can reduce the tilt angle of each reflecting surface.

In Embodiment 2, the size of the image forming element P in the plane (YZ plane) including the reference axis A is 9.8 mm, and the maximum spacing between two adjacent surfaces is 170 mm which is approximately 17 times larger than the size of the image forming element P. Thus, the maximum spacing between two adjacent surfaces sufficiently satisfies the expression (1).

Figure 7:
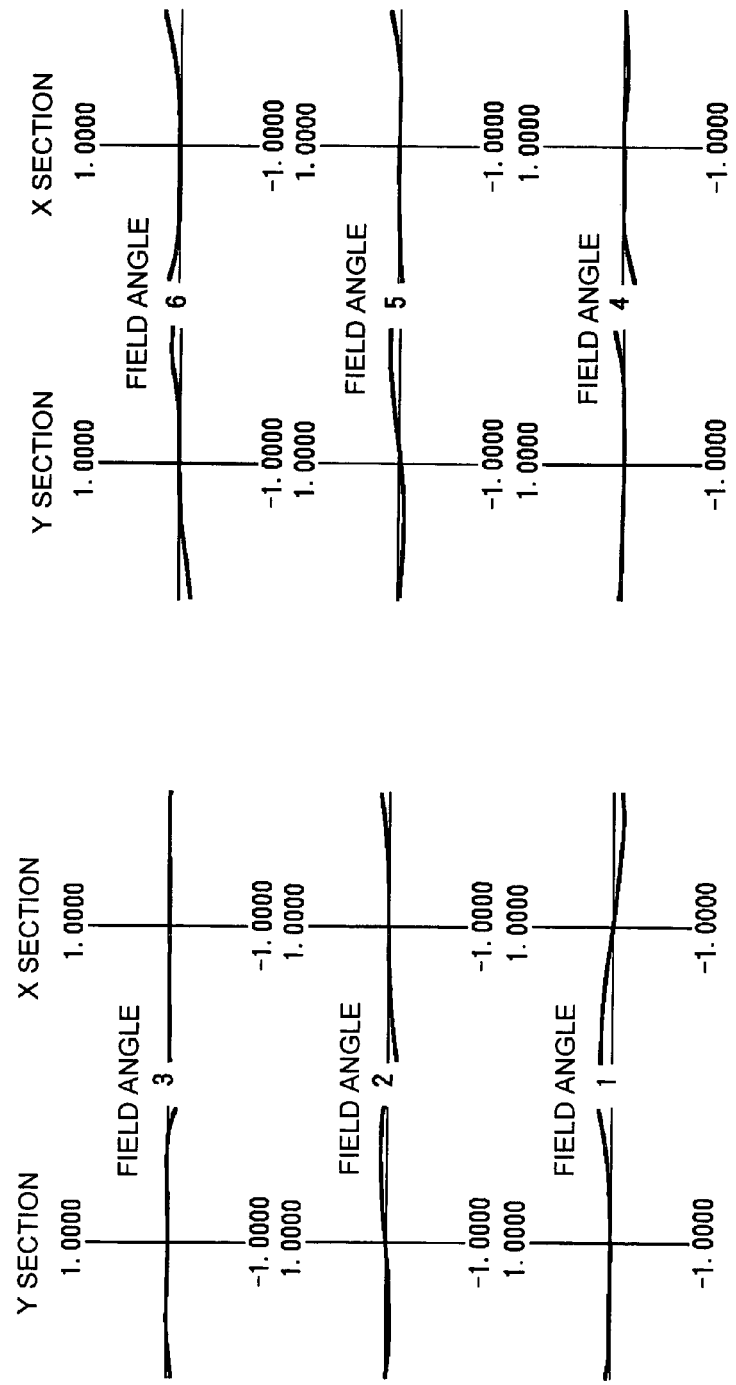
FIG. 7 shows lateral aberration of the projection optical system shown in FIG. 5.
Figure 8:
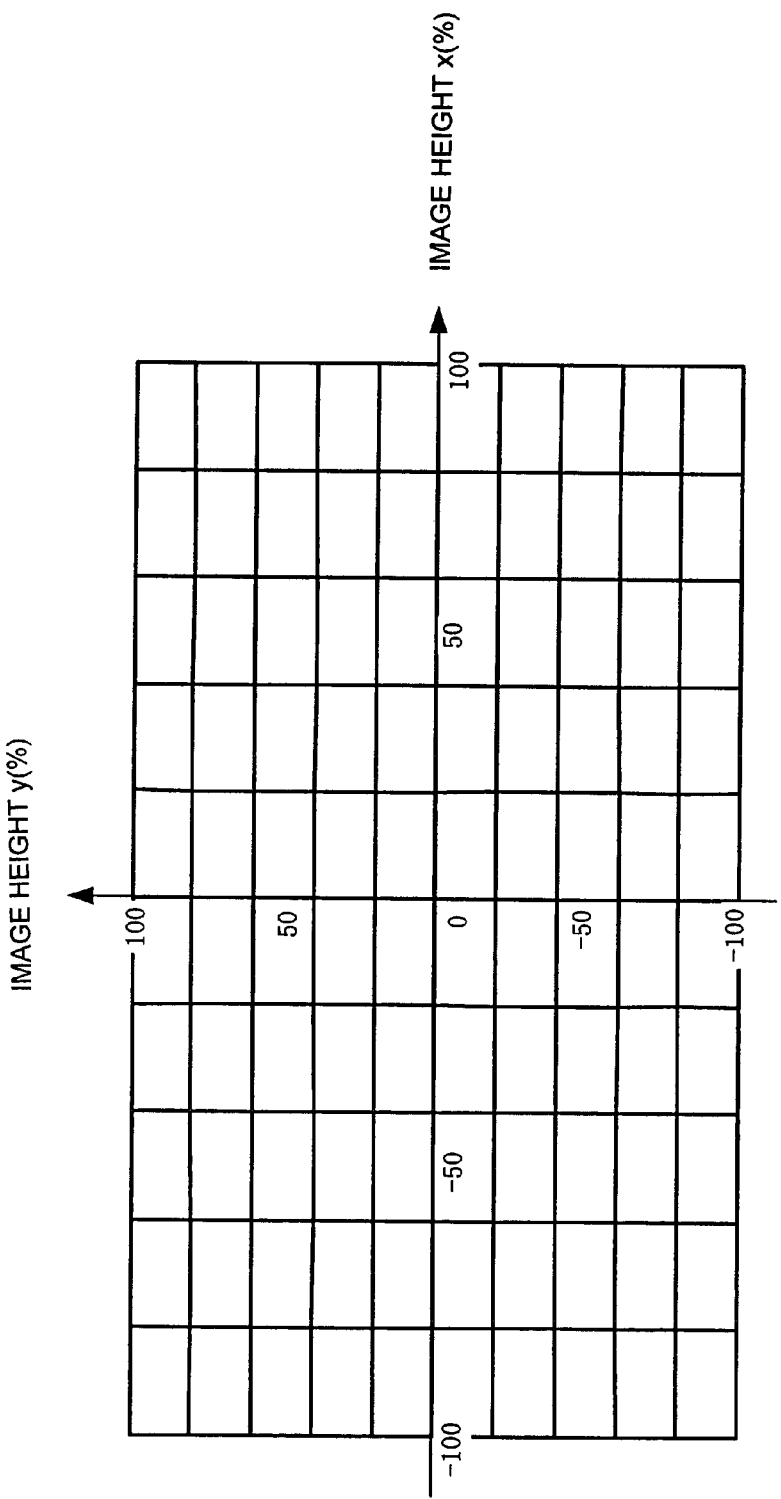
FIG. 8 shows distortion of the projection optical system shown in FIG. 5.

FIG. 7 shows lateral aberration on the screen S of the projection optical system 2 in Embodiment 2, and FIG. 8 shows distortion on the screen S. As seen from FIGS. 7 and 8, sufficient performance can be ensured for both of them.

(Embodiment 3)

Figure 9:
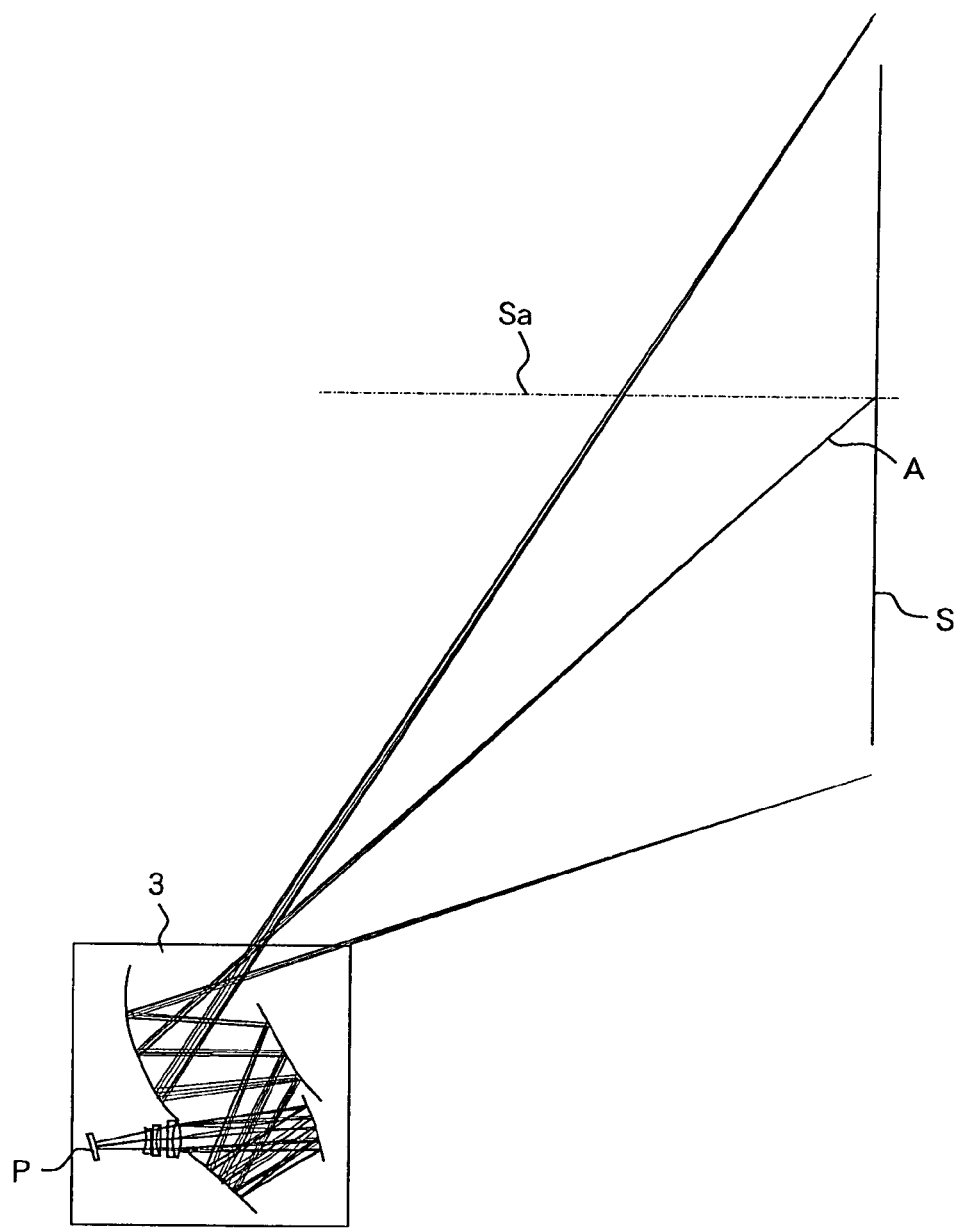
FIG. 9 shows the overall structure of all optical systems of a projector including a projection optical system which is Embodiment 3 of the present invention, in a YZ plane.

FIG. 9 shows an optical system which is Embodiment 3 of the present invention. P shows an image forming element for which a reflective type dot matrix liquid crystal display, a digital micromirror device (DMD), a self-light-emitting element (such as an organic electroluminescence element) or the like is used. It goes without saying that a transmissive type image forming element may be used.

Figure 10:
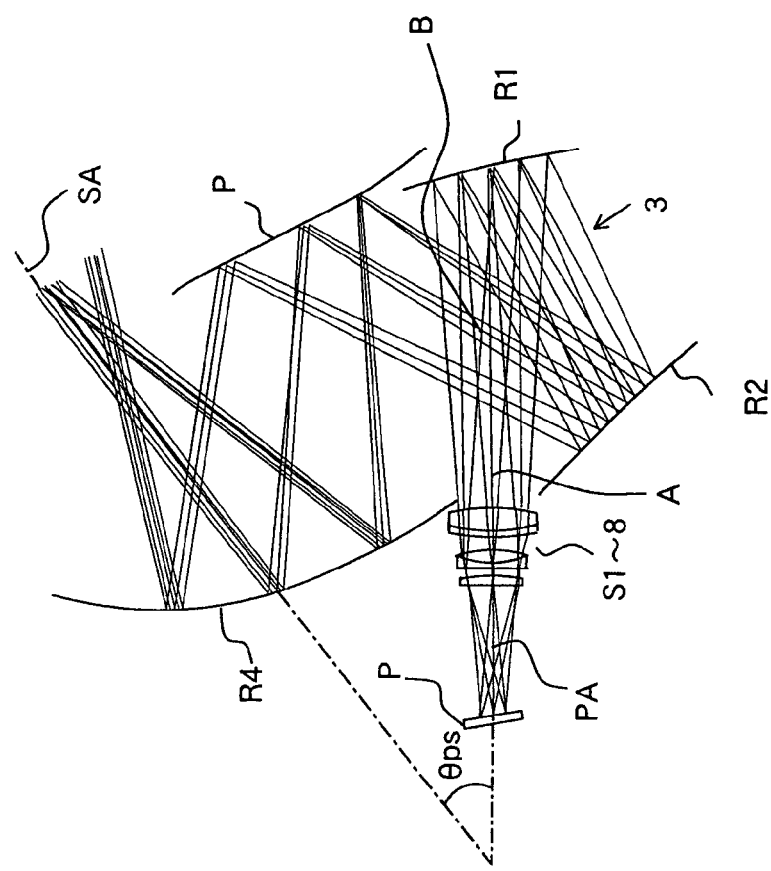
FIG. 10 is an enlarged view of the projection optical system shown in FIG. 9.

The image forming element P is inclined by 10 degrees with respect to the reference axis A. Reference numeral 3 shows a projection optical system for enlargingly projecting an original image formed on the image forming element P onto a screen S. FIG. 10 shows the projection optical system 3 in detail.

The image forming element P has a size of 17.4 mm×9.8 mm, and the screen S has a size of 60 inches diagonally with an aspect ratio of 16:9. A normal line Sa to the screen S is inclined by 42.53 degrees with respect to the reference axis A. The incident side reference axis PA of the projection optical system 3 forms an angle $\theta_{PS}$ of 47.47 degrees with the emerging side reference axis SA of the projection optical system 3.

In the following, data for representing the optical system used in Embodiment 3 is shown.

Aperture Stop Diameter 18.00
i Yi Zi θi Di Ni vi
C1 0.00 0.00 0.00 3.05 1.48927 0.00 cover glass
C2 0.53 3.00 0.00 50.45 1 cover glass
Stop 9.12 52.71 10.00 1.23 1 aperture stop
S1 9.33 53.92 10.00 4.00 1.48915 0.00 refracting surface
S2 10.03 57.86 10.00 3.00 1 refracting surface
S3 10.55 60.82 10.00 2.00 1.83932 0.00 refracting surface
S4 10.89 62.78 10.00 5.00 1.51976 0.00 refracting surface
S5 11.76 67.71 10.00 6.28 1 refracting surface
S6 12.85 73.90 10.00 2.00 1.83932 0.00 refracting surface
S7 13.20 75.87 10.00 8.00 1.48915 0.00 refracting surface
S8 14.59 83.75 10.00 135.00 1 refracting surface
R1 38.03 216.69 −3.42 110.00 1 reflecting surface
R2 69.91 111.41 −32.84 145.00 1 reflecting surface
R3 −39.27 206.84 −16.84 145.00 1 reflecting surface
R4 −77.18 66.88 −6.19 965.00 1 reflecting surface
−523.21 922.62 15.00 1 image surface Spherical Surface Data
S1 150.362
S2 −50.012
S3 −92.245
S4 68.215
S5 −54.407
S6 126.653
S7 84.514
S8 −98.442

Aspheric Surface Data

R1
 $C02$=−1.0421e-003 $C20$=−4.37676e-004
 $C03$=1.35335e-008 $C21$=3.07818e-006
 $C04$=4.32401e-008 $C22$=7.30854e-008 $C40$=2.66010e-008
 $C05$=4.40706e-011 $C23$=−2.3781e-011 $C41$=4.03472e-010
 $C06$=−4.7363e-012 $C24$=−1.3592e-011 $C42$=−5.0835e-012
 $C60$=1.91766e-012

R2
 $C02$=−8.6142e-004 $C20$=6.47535e-004
 $C03$=5.48977e-006 $C21$=9.26220e-006
 $C04$=9.10710e-008 $C22$=4.12278e-008 $C40$=−1.13111e-008
 $C05$=1.77815e-010 $C23$=1.60165e-010 $C41$=8.70239e-010
 $C06$=−2.9828e-011 $C24$=−4.3180e-011 $C42$=−1.9391e-011
 $C60$=−3.59011e-013

R3
 $C02$=1.00000e-005 $C20$=1.25000e-003
 $C03$=6.62116e-006 $C21$=1.29522e-005
 $C04$=1.66226e-007 $C22$=8.08754e-008 $C40$=−1.20027e-007
 $C05$=2.19980e-009 $C23$=4.22156e-009 $C41$=3.32265e-009
 $C06$=−3.0741e-019 $C24$=3.60127e-011 $C42$=2.27463e-011
 $C60$=5.60646e-012

R4
 $C02$=2.56563e-003 $C20$=4.23513e-003
 $C03$=−9.5763e-006 $C21$=−1.84062e-005
 $C04$=6.43782e-008 $C22$=1.20695e-007 $C40$=1.05267e-009
 $C05$=−2.0214e-011 $C23$=−2.5036e-010 $C41$=1.57493e-010
 $C06$=−1.7730e-012 $C24$=6.76197e-013 $C42$=−1.88987e-13
 $C60$=3.36977e-013

In FIGS. 9 and 10, the projection optical system 3 is composed of a cover glass of the image forming element P, an aperture stop, a refractive optical system S1 to S8, and a reflective optical system having four reflecting surfaces including a concave mirror R1, a convex mirror R2, a convex mirror R3, and a concave mirror R4, in the order in which rays from the image forming element P pass through. All the reflecting surfaces are symmetrical only with respect to the YZ plane.

Luminous flux forms an intermediate image near the convex mirror R3, is reflected by the concave mirror R4, and then forms a pupil image. In addition, luminous flux traveling from S8 to R1 intersects with luminous flux traveling from R2 to R3. The angle between the normal line to each reflecting surface and the reference axis A is as small as 32 degrees at most.

The intersection B of the reference axis A in this manner can reduce the tilt angle of each reflecting surface.

In Embodiment 3, the size of the image forming element P in the bending direction for forming the intersection of the reference axis A (that is, in a plane including the reference axis A) is 9.8 mm, and the maximum spacing between two adjacent surfaces is 145 mm which is approximately 15 times larger than the size of the image forming element P. Thus, the sufficient spacing for satisfying the expression (1) is provided.

Figure 11:
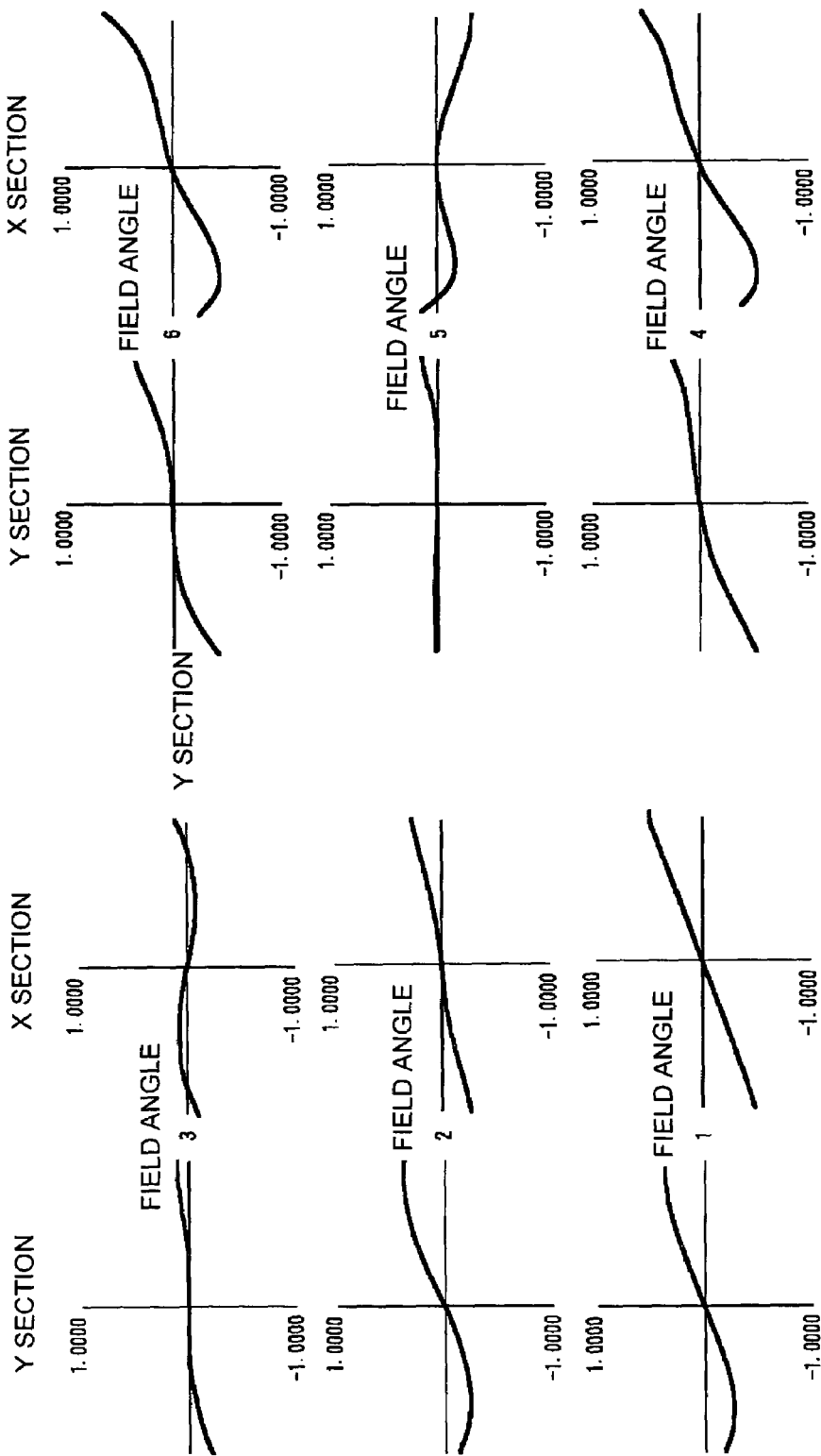
FIG. 11 shows lateral aberration of the projection optical system shown in FIG. 9.
Figure 12:
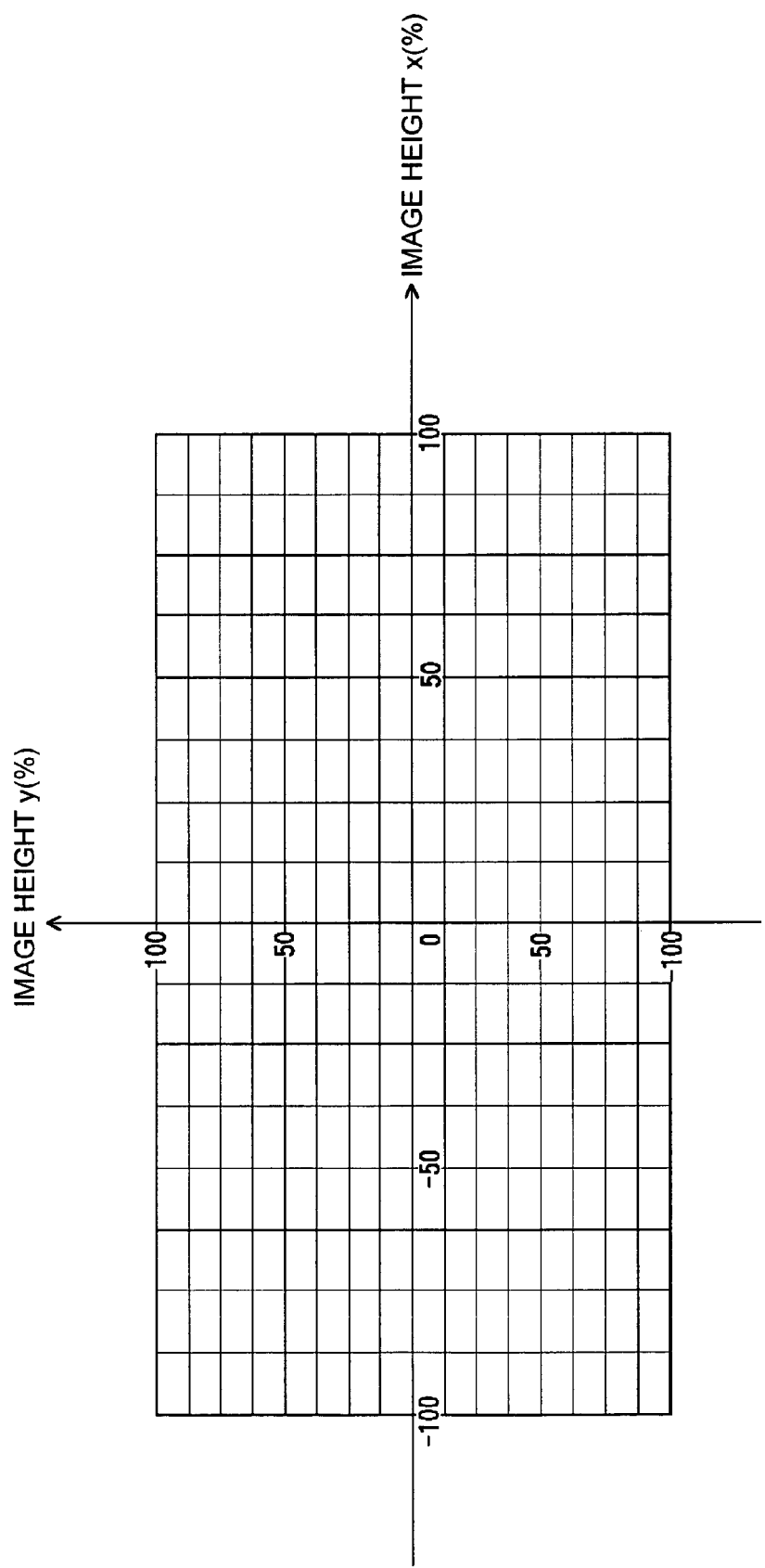
FIG. 12 shows distortion of the projection optical system shown in FIG. 9.

FIG. 11 shows lateral aberration on the screen S, and FIG. 12 shows distortion on the screen S. As seen from FIGS. 11 and 12, sufficient performance can be ensured for both of them.

While Embodiments of the present invention have been described for the case where the aperture stop is provided between the image forming element and the projection optical system, the projection optical system of the present invention is not limited thereto.

Also, while Embodiments of the present invention have the rotationally asymmetric reflecting surfaces, each of which is symmetric with respect to a plane, the present invention is not limited thereto.

In addition, the arrangement of the optical surfaces in the projection optical system of the present invention is not limited by Embodiments 1 to 3.

In Embodiments 1 to 3, the plane including the central principal ray (reference axis) passing through the projection optical system comprised of the plurality of reflecting surfaces having optical powers is perpendicular to the screen (projection surface). However, this is not essential. Specifically, the plane including the central principal ray may be substantially parallel to the screen. Alternatively, the normal line to the image display surface of the image forming element (a display device such as a transmissive type liquid crystal panel, a reflective type liquid crystal panel, and a DMD) may be perpendicular to the normal to the screen.

In such a case, a reflective member such as a plane mirror with no optical power can be used between the screen and the final reflecting surface (the surface which is closest to the screen and having an optical power) among the plurality of reflecting surfaces to direct the optical path of the central principal ray toward the screen. This enables the optical path to be bent while the characteristics of the present invention are maintained, thereby achieving a further reduction in size and thickness of the whole projection type image display apparatus. Preferably, two or three plane mirrors may be used.

In Embodiment 3, the optical axis of the refractive optical system may be substantially parallel to the screen or may be substantially perpendicular to the normal line to the screen. In this event, the normal line to the plane including the reference axis of the reflecting surfaces may be substantially perpendicular to the normal line to the screen. Alternatively, the normal line to the plane including the reference axis of the reflecting surfaces may be substantially parallel to the normal line to the screen.

As described above, according to each of Embodiments 1 to 3, it is possible to realize the projection optical system in which the reference axis has at least one intersection in the projection optical system (especially, in the reflective optical system) to provide a large angle (for example, 30 degrees or more) between the incident side references axis and the emerging side reference axis while a small tilt angle of each reflecting surface is maintained. In addition, the sufficient spacing between two adjacent reflecting surfaces can be ensured to prevent interference of light rays.

While preferred embodiments have been described, it is to be understood that modification and variation of the present invention may be made without departing from the scope of the following claims.

What is claimed is:

1. A projection optical system which projects luminous flux from an image forming element which forms an original image onto a projection plane, the projection optical system comprising:
   a first reflecting portion which is disposed the closest to the projection plane in an optical path from the image forming element to the projection plane out of a plurality of reflecting portions with curvatures;
   a second reflecting portion which is disposed second closest to the projection plane in the optical path out of the reflecting portions,
   a third reflecting portion which is disposed third closest to the projection plane in the optical path out of the reflecting portions,
   wherein the first reflecting portion, the second reflecting portion and the third reflecting portion are different from one another;
   a reference axis is defined as a path of a central principal ray which is a principal ray of luminous flux from the center of the original image to the center of a finally formed image projected onto the projection plane, and the reference axis on an incident side and the reference axis on an emerging side of the projection optical system are oblique to each other; and
   the reference axis between the second reflecting portion and the third reflecting portion intersects with the reference axis between the first reflecting portion and the projection plane.

2. The projection optical system according to claim 1, wherein a spacing between the second reflecting portion and the third reflecting portion is at least 2.5 times larger than a width of luminous flux incident on the third reflecting portion.

3. The projection optical system according to claim 1, wherein luminous flux from the image forming element forms an intermediate image between the image forming element and the projection plane; and
   in a plane including the reference axis, a size of the intermediate image is 2.5 to 7 times of the original image formed by the image forming element.

4. The projection optical system according to claim 1, wherein the reference axis on the incident side forms an angle of 30 degrees or more with the reference axis on the emerging side.

5. The projection optical system according to claim 1, wherein each of the reflecting portions is formed of a mirror.

6. The projection optical system according to claim 1, wherein the following expression is satisfied:

$$L > 7Y$$

where L represents a maximum spacing between two adjacent reflecting portions along the reference axis of the reflecting portions and Y represents a size of the original image in a plane including the reference axis.

7. The projection optical system according to claim 1, wherein a maximum field angle on the incidence side or a maximum field angle on the emerging side of the projection optical system is equal to or larger than 20 degrees.

8. The projection optical system according to claim 1, wherein a normal line to the image forming element is substantially perpendicular to a normal line to the projection plane.

9. A projection type image display apparatus comprising:
   an image forming element which forms an original image; and
   the projection optical system according to claim 1.

10. An image display system comprising:
    the projection type image display apparatus according to claim 9; and
    an image information supply apparatus which supplies the projection type image display apparatus with image information for displaying the original image on the image forming element.

* * * * *